United States Patent
Zhang et al.

(10) Patent No.: US 9,757,892 B2
(45) Date of Patent: Sep. 12, 2017

(54) THERMOPLASTIC COMPOSITION WITH LOW HYDROCARBON UPTAKE

(71) Applicant: Ticona LLC, Florence, KY (US)

(72) Inventors: Bin Zhang, Florence, KY (US); Rong Luo, Florence, KY (US); Xiaoyan Tu, Freemont, CA (US)

(73) Assignee: Ticona LLC, Florence, KY (US)

( * ) Notice: Subject to any disclaimer, the term of this patent is extended or adjusted under 35 U.S.C. 154(b) by 482 days.

(21) Appl. No.: 14/467,342

(22) Filed: Aug. 25, 2014

(65) Prior Publication Data

US 2015/0072093 A1     Mar. 12, 2015

Related U.S. Application Data

(60) Provisional application No. 61/870,506, filed on Aug. 27, 2013.

(51) Int. Cl.
*B29C 51/00* (2006.01)
*B29C 43/20* (2006.01)
(Continued)

(52) U.S. Cl.
CPC ............ *B29C 51/002* (2013.01); *B29C 43/20* (2013.01); *B29C 47/0014* (2013.01);
(Continued)

(58) Field of Classification Search
CPC ... B29C 51/002; B29C 43/20; B29C 47/0014; B29C 47/0023; B29C 47/1027; B29C 47/1063; B29C 47/1081; B29C 47/40; B29C 47/68; B29C 49/00; B29C 51/00; B29C 49/04; B29C 49/22; B29K 2081/00; B29K 2023/0683; B29K 2083/00; B29K 2509/08; B29K 2105/0038; B29K 2281/04; B29K 2305/00; B29K 2911/00;
(Continued)

(56) References Cited

U.S. PATENT DOCUMENTS 3,354,129 A    11/1967  Edmonds, Jr. et al.
3,919,177 A    11/1975  Campbell
(Continued)

FOREIGN PATENT DOCUMENTS

CA    2032370    6/1991
FR    2617176    12/1988
(Continued)

OTHER PUBLICATIONS

International Patent Application No. PCT/US2014/052459, International Search Report and Written Opinion, dated Oct. 3, 2014.

*Primary Examiner* — Michael C Miggins
(74) *Attorney, Agent, or Firm* — Dority & Manning, P.A.

(57) ABSTRACT

Thermoplastic compositions are described that exhibit resistance to hydrocarbon absorption. Methods for forming the thermoplastic compositions are also described. Formation methods include combining a polyarylene sulfide with a first impact modifier and a second impact modifier such that the impact modifiers are dispersed throughout the polyarylene sulfide. A crosslinking agent can be combined with the other components of the composition following dispersal of the additives throughout the composition to dynamically crosslink at least one of the first and second impact modifiers.

36 Claims, 5 Drawing Sheets

(51) Int. Cl.
| | |
|---|---|
| B29C 47/00 | (2006.01) |
| B29K 81/00 | (2006.01) |
| B29K 23/00 | (2006.01) |
| B29K 83/00 | (2006.01) |
| B29K 509/08 | (2006.01) |
| B29K 105/00 | (2006.01) |
| B29K 305/00 | (2006.01) |
| B29C 47/10 | (2006.01) |
| B29C 47/40 | (2006.01) |
| B29C 47/68 | (2006.01) |
| B29C 49/00 | (2006.01) |
| B29K 105/16 | (2006.01) |
| B29K 307/04 | (2006.01) |
| B29K 309/08 | (2006.01) |
| B29K 105/12 | (2006.01) |
| B29C 49/04 | (2006.01) |
| B29C 49/22 | (2006.01) |
| F16L 11/04 | (2006.01) |
| F16L 11/22 | (2006.01) |

(52) U.S. Cl.
CPC ...... B29C 47/0023 (2013.01); B29C 47/1027 (2013.01); B29C 47/1063 (2013.01); B29C 47/1081 (2013.01); B29C 47/40 (2013.01); B29C 47/68 (2013.01); B29C 49/00 (2013.01); B29C 49/04 (2013.01); B29C 49/22 (2013.01); B29C 51/00 (2013.01); B29K 2023/0683 (2013.01); B29K 2081/00 (2013.01); B29K 2083/00 (2013.01); B29K 2105/0026 (2013.01); B29K 2105/0032 (2013.01); B29K 2105/0038 (2013.01); B29K 2105/0044 (2013.01); B29K 2105/12 (2013.01); B29K 2105/16 (2013.01); B29K 2281/04 (2013.01); B29K 2305/00 (2013.01); B29K 2307/04 (2013.01); B29K 2309/08 (2013.01); B29K 2509/08 (2013.01); B29K 2911/00 (2013.01); F16L 11/04 (2013.01); F16L 11/22 (2013.01); Y10T 428/139 (2015.01); Y10T 428/1393 (2015.01)

(58) Field of Classification Search
CPC .... B29K 2105/0032; B29K 2105/0026; B29K 2105/0044; B29K 2105/16; B29K 2307/04; B29K 2309/08; B29K 2105/12; Y10T 428/139; Y10T 428/1393; F16L 11/04; F16L 11/22
See application file for complete search history.

(56) References Cited

U.S. PATENT DOCUMENTS

| | | |
|---|---|---|
| 4,337,329 A | 6/1982 | Kubo et al. |
| 4,368,321 A | 1/1983 | Sherk et al. |
| 4,371,671 A | 2/1983 | Anderson |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 4,814,430 A | 3/1989 | Iwasaki et al. |
| 4,889,893 A | 12/1989 | Kobayashi et al. |
| 5,006,605 A | 4/1991 | Mizuno et al. |
| 5,047,465 A | 9/1991 | Auerbach |
| 5,087,666 A | 2/1992 | Yu et al. |
| 5,149,731 A | 9/1992 | Uota et al. |
| 5,240,973 A | 8/1993 | Katoh et al. |
| 5,240,988 A | 8/1993 | Kohler et al. |
| 5,248,730 A | 9/1993 | Yamao |
| 5,270,305 A | 12/1993 | Palmer |
| 5,380,783 A | 1/1995 | Satake et al. |
| 5,397,839 A | 3/1995 | Patel |
| 5,504,141 A | 4/1996 | Collard et al. |
| 5,578,679 A | 11/1996 | Suzuki et al. |
| 5,589,544 A | 12/1996 | Horrion |
| 5,625,002 A | 4/1997 | Kadoi et al. |
| 5,652,287 A | 7/1997 | Sullivan |
| 5,654,358 A | 8/1997 | Kadoi et al. |
| 5,668,214 A | 9/1997 | Suzuki |
| 5,817,723 A | 10/1998 | Flexman, Jr. et al. |
| 5,830,965 A | 11/1998 | Imaizumi et al. |
| 5,837,758 A | 11/1998 | Brown et al. |
| 5,840,830 A | 11/1998 | Miyahara et al. |
| 6,001,934 A | 12/1999 | Yamanaka et al. |
| 6,015,858 A | 1/2000 | Gornowicz |
| 6,020,431 A | 2/2000 | Venkataswamy et al. |
| 6,117,950 A | 9/2000 | Yamao et al. |
| 6,225,416 B1 | 5/2001 | Reil et al. |
| 6,281,286 B1 | 8/2001 | Chorvath et al. |
| 6,362,287 B1 | 3/2002 | Chorvath et al. |
| 6,417,293 B1 | 7/2002 | Chorvath et al. |
| 6,538,071 B1 | 3/2003 | Fuchs |
| 6,569,955 B1 | 5/2003 | Brewer et al. |
| 6,569,958 B1 | 5/2003 | Gross et al. |
| 6,608,136 B1 | 8/2003 | Dean et al. |
| 6,649,704 B2 | 11/2003 | Brewer et al. |
| 6,653,437 B2 | 11/2003 | Hinokimori et al. |
| 6,657,014 B1 | 12/2003 | Mori et al. |
| 6,699,946 B1 | 3/2004 | Lambla et al. |
| 6,713,569 B2 | 3/2004 | Chorvath et al. |
| 6,740,707 B2 | 5/2004 | Ono et al. |
| 6,740,709 B2 | 5/2004 | Ono et al. |
| 6,743,868 B2 | 6/2004 | Fournier et al. |
| 6,849,697 B2 | 2/2005 | Lambla et al. |
| 6,875,517 B2 | 4/2005 | Bosshammer et al. |
| 6,888,719 B1 | 5/2005 | Janzen et al. |
| 7,011,114 B2 | 3/2006 | Suzuki et al. |
| 7,041,741 B2 | 5/2006 | Patel et al. |
| 7,208,207 B2 | 4/2007 | Ono et al. |
| 7,442,744 B2 | 10/2008 | Tokushige et al. |
| 7,960,473 B2 | 6/2011 | Kobayashi et al. |
| 7,981,981 B2 | 7/2011 | Ajbani et al. |
| 2005/0208248 A1 | 9/2005 | Ilo et al. |
| 2006/0229417 A1 | 10/2006 | Ferrate et al. |
| 2010/0048777 A1 | 2/2010 | Kodama et al. |
| 2011/0287201 A1 | 11/2011 | Abe et al. |
| 2012/0037397 A1 | 2/2012 | Mhetar |
| 2013/0059976 A1 | 3/2013 | Matsuo et al. |
| 2013/0273286 A1 | 10/2013 | Luo et al. |
| 2013/0273287 A1 | 10/2013 | Luo et al. |
| 2013/0273288 A1 | 10/2013 | Luo et al. |
| 2013/0273289 A1 | 10/2013 | Luo et al. |
| 2013/0273290 A1 | 10/2013 | Luo et al. |

FOREIGN PATENT DOCUMENTS

| | | |
|---|---|---|
| GB | 1558491 | 1/1980 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 4235893 B | 3/2009 |
| JP | 4552434 | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | 91/18055 | 11/1991 |
| WO | 94/16018 | 7/1994 |
| WO | 2007-169550 A | 7/2007 |
| WO | 2013/101315 A1 | 7/2013 |
| WO | 2013/154741 | 10/2013 |

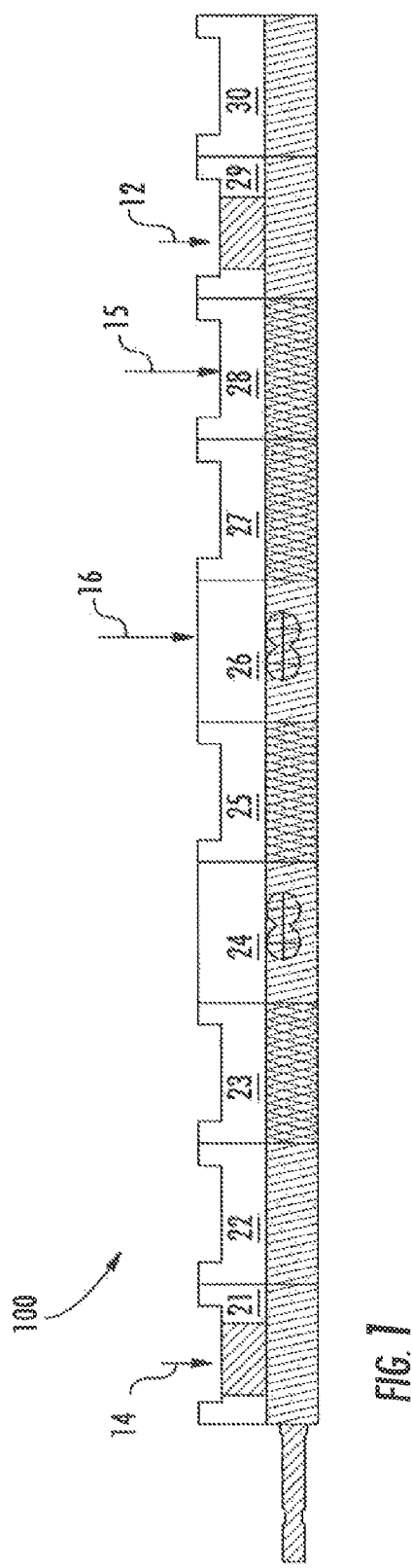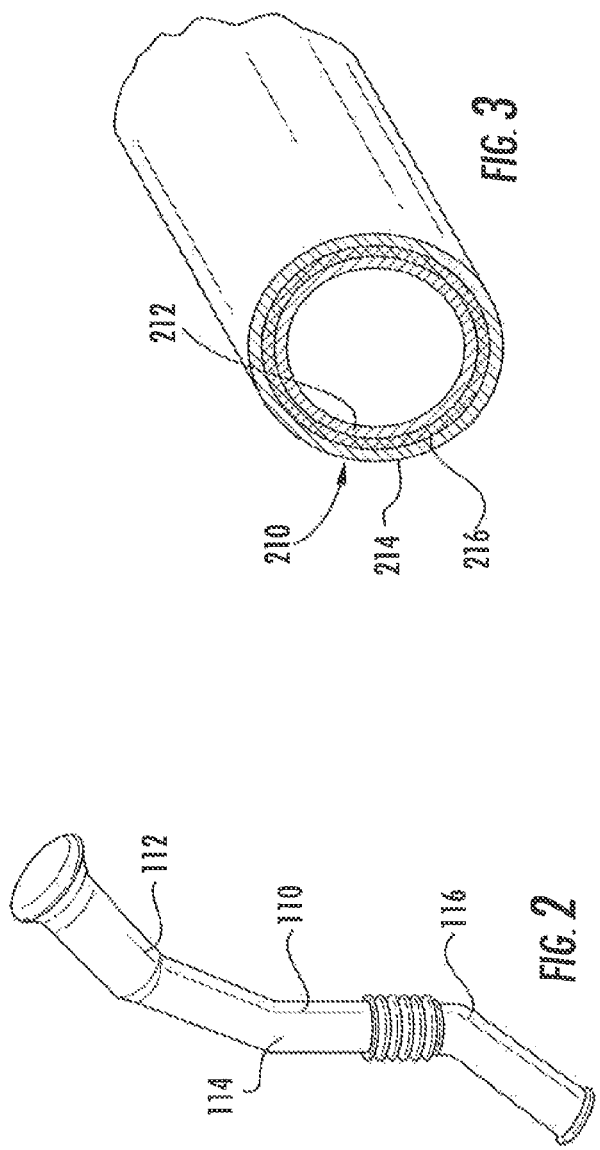

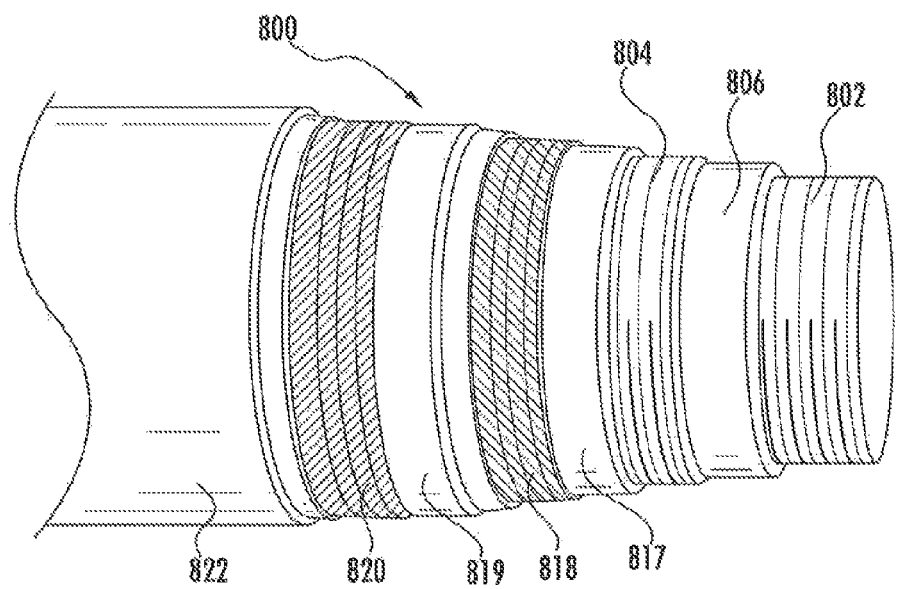
FIG. 6
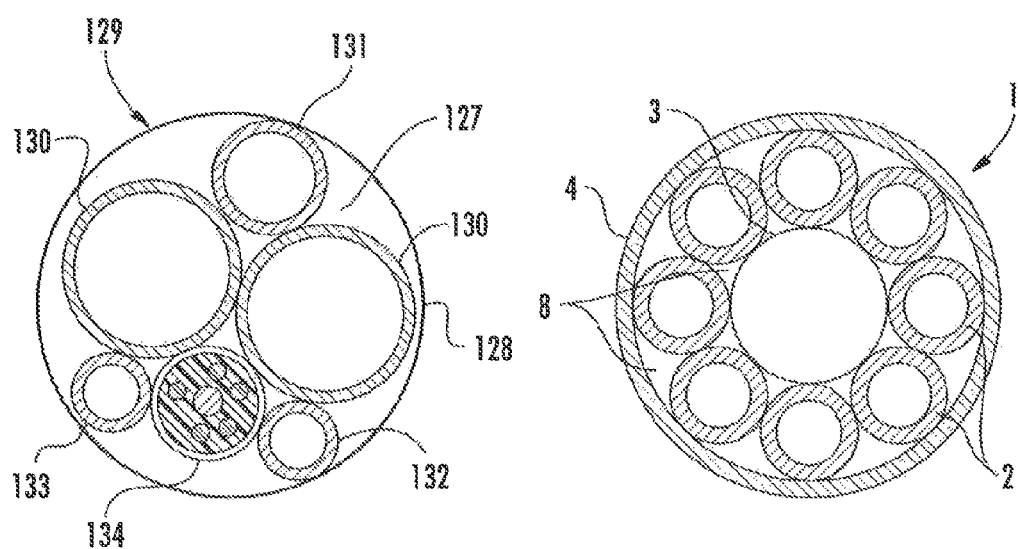
FIG. 7
FIG. 8

THERMOPLASTIC COMPOSITION WITH LOW HYDROCARBON UPTAKE

CROSS REFERENCE TO RELATED APPLICATION

This application claims filing benefit of U.S. Provisional Patent Application Ser. No. 61/870,506 having a filing date of Aug. 27, 2013, which is incorporated herein by reference in its entirety.

BACKGROUND OF THE INVENTION

High performance polymers are a class of polymers that exhibit good temperature and chemical resistance. These materials have been examined for use in a variety of applications due to their excellent physical characteristics and low weight. For instance, replacement of metal components with high performance polymers can provide lower weight, lower cost products (e.g., piping) with physical characteristics that meet or exceed those formed of traditional materials.

Polyarylene sulfides are high-performance polymers that have often been blended with other components to provide thermoplastic compositions having the excellent characteristics of the high performance polymer in conjunction with other desirable characteristics. For example, elastomeric impact modifiers have been combined with polyarylene sulfides for improvement of the physical properties of thermoplastic compositions.

Unfortunately, elastomeric polymers generally considered useful for impact modification are expensive, adding significantly to the costs of the thermoplastic compositions. Moreover, typical impact modification polymers are not compatible with polyarylene sulfides and phase separation has been a problem in forming compositions of the two. Attempts have been made to improve formation of the compositions, for instance through the utilization of compatibilizers. However, even upon such modifications, compositions including polyarylene sulfides in combination with impact modifying polymers still fail to provide product performance as desired, particularly in applications that require resistance to hydrocarbon absorption such as oil and gas applications.

Polyolefin compositions have been formed in the past by uniformly mixing an elastic component with a thermoplastic polyolefin such that the elastomer is intimately and uniformly dispersed as a discrete or co-continuous phase within a continuous phase of the polyolefin. Vulcanization of the composite has been utilized to crosslink the components and further improve dispersion. When vulcanization is carried out in conjunction with combination of the various polymeric components it is termed dynamic vulcanization.

What are needed in the art are lower cost polyarylene sulfide-based thermoplastic compositions that can exhibit desirable characteristics.

SUMMARY OF THE INVENTION

Disclosed in one embodiment is a thermoplastic composition that includes a polyarylene sulfide in conjunction with at least two impact modifiers. More specifically, the composition can include a first impact modifier that is a crosslinked impact modifier and a second impact modifier. Among other desirable characteristics, the thermoplastic composition can exhibit low hydrocarbon uptake. For instance, the thermoplastic composition can exhibit a weight change of about 6% or less following long term (e.g. greater than about 4 days) exposure to hydrocarbons.

Also disclosed is a method for forming a thermoplastic composition. A method can include feeding polyarylene sulfide, a first impact modifier, and a second impact modifier to a melt processing unit. In addition, a crosslinking agent can be fed to the processing unit following combination of the first and second impact modifiers with the polyarylene sulfide and following distribution of the impact modifiers throughout the polyarylene sulfide. Thus, the composition can be dynamically crosslinked via the first impact modifier.

Also disclosed are products that can beneficially incorporate the thermoplastic composition including, without limitation, tubular members, including both single layer and multi-layer tubular members. Tubular members can encompass pipes and hoses suitable for carrying hydrocarbons such as production fluids as well as refined products including oil, gas, fuel, etc. For instance, the thermoplastic composition may be beneficially utilized in forming risers as well as other components (e.g., connectors) as may be utilized in oil and gas applications.

BRIEF DESCRIPTION OF THE FIGURES

The present disclosure may be better understood with reference to the following figures:

FIG. 1 is a schematic representation of a process for forming the thermoplastic composition as disclosed herein.

FIG. 2 is a single layer tubular member as may be formed from the thermoplastic composition.

FIG. 3 is a multi-layer tubular member, one or more layers of which may be formed from the thermoplastic composition.

FIG. 6 is a schematic representation of a multilayer riser including a barrier layer formed of the thermoplastic composition as described herein.

FIG. 7 illustrates a bundled riser including one or more flowlines as described herein.

FIG. 8 illustrates another embodiment of a bundled riser.

DETAILED DESCRIPTION

Figure 4:
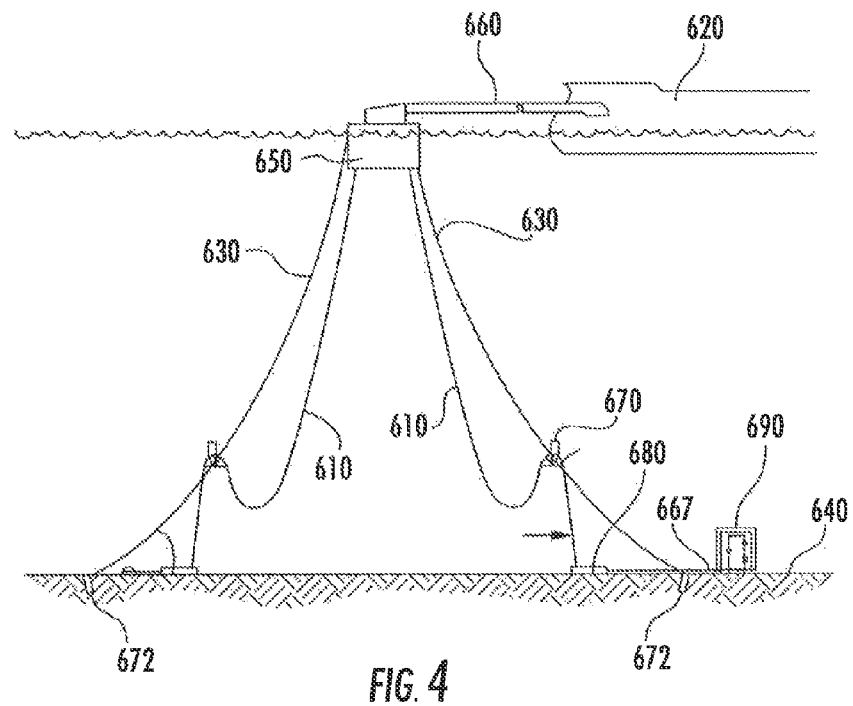
FIG. 4 illustrates an oil and gas system including a flexible riser flowline extending from the sea floor to a surface unit.

It is to be understood by one of ordinary skill in the art that the present discussion is a description of exemplary embodiments only, and is not intended as limiting the broader aspects of the present disclosure.

The present disclosure is generally directed to thermoplastic compositions that exhibit excellent strength and flexibility characteristics as well as resistance to hydrocarbon absorption. More specifically, the thermoplastic compositions include a polyarylene sulfide and at least two impact modifiers, one of which is dynamically crosslinked. Following contact with a heated hydrocarbon solution for a period of about 4 days, the thermoplastic composition can exhibit a weight change of about 6% or less, about 4% or less, about 2% or less, about 1% or less, about 0.5% or less, or about 0.3% or less. Following contact for about 6 days, the thermoplastic composition can exhibit a weight change of about 8% or less, about 7% or less, about 6% or less, about 1% or less, about 0.5% or less, or about 0.3% or less; and following contact for about 14 days, the thermoplastic composition can exhibit a weight change of about 7% or less, about 6% or less, about 2% or less, about 1% or less, about 0.5% or less, or about 0.3% or less.

When compared to a similar thermoplastic composition that includes only a single impact modifier, the disclosed compositions can exhibit lower hydrocarbon absorption. For instance, a thermoplastic composition utilizing the dual impact modifier system can exhibit about 80% or less, about 75% or less, about 50% or less, about 15% or less, about 10% or less, or about 9% or less of the weight change of a thermoplastic composition that varies from the dual impact modified composition only by the lack of inclusion of the second impact modifier to the composition.

Due to the low hydrocarbon absorption of the thermoplastic composition, the density and the volume of the composition can exhibit very little change over time. For instance, following contact with a heated hydrocarbon solution for a period of about 6 days, the thermoplastic composition can exhibit a density retention of about 95% or greater, for instance about 96% or greater, or about 97% or greater.

Following contact with a heated hydrocarbon solution for a period of about 6 days, the thermoplastic composition can exhibit a volume change of about 10.5% or less, about 10.0% or less in some embodiments, and about 9.8% or less in some embodiments.

Beneficially, the thermoplastic composition can maintain desirable characteristics over long term exposure to hydrocarbons as may be encountered in a variety of different applications. By way of example, the thermoplastic composition may be particularly useful in oil and gas applications, exemplary embodiments of which are described further herein. Moreover, the thermoplastic composition can be formed with a lower total concentration of impact modifiers as compared to previously known impact modified compositions, which can translate to significant cost savings.

The thermoplastic composition can be formed according to a melt processing technique that includes combining a polyarylene sulfide with at least two impact modifiers to form a mixture. More specifically, the polyarylene sulfide can be combined with a first and second impact modifiers and this mixture can be subjected to shear conditions such that the impact modifiers become well distributed throughout the polyarylene sulfide. Following formation of the mixture, a polyfunctional crosslinking agent can be added and the composition can be dynamically vulcanized. The polyfunctional crosslinking agent can react with at least one of the impact modifiers of the mixture to form crosslinks in the composition, for instance within and between the polymer chains of one of the impact modifier and optionally also within and between the polymer chains of the second impact modifier. Crosslinks can also be formed between the various components of the composition, for instance between the two impact modifiers, and/or within and between the polymer chains of the polyarylene sulfide and/or between one or both of the impact modifiers and the polyarylene sulfide.

A formation process can include functionalization of the polyarylene sulfide. This can provide additional sites for bonding between the polyarylene sulfide and other components of the compositions, which can further improve distribution of the additives throughout the polyarylene sulfide and further prevent phase separation. Moreover, functionalization of the polyarylene sulfide can include scission of the polyarylene sulfide chain, which can decrease the melt viscosity of the composition and improve processibility. This can also provide a thermoplastic composition that is a low halogen, e.g., low chlorine composition that exhibits excellent physical characteristics and high resistance to degradation.

To provide further improvements to the thermoplastic composition, the composition can be formed to include other conventional additives such as fillers, lubricants, colorants, etc. according to standard practice.

The high strength and flexibility characteristics of the thermoplastic composition can be evident by examination of the tensile, flexural, and/or impact properties of the materials. For example, the thermoplastic composition can have a notched Charpy impact strength of greater than about 6 kilojoules per square meter ($kJ/m^2$), or greater than about 7 $kJ/m^2$ at 23° C. When dynamically crosslinked, the thermoplastic composition can exhibit a higher notched Charpy impact strength, for instance greater than about 40 $kJ/m^2$, greater than about 45 $kJ/m^2$, or greater than about 50 $kJ/m^2$ at 23° C. Charpy notched impact strength may be determined according to ISO Test No. 179-1 (technically equivalent to ASTM D256, Method B)

Beneficially, the thermoplastic composition can maintain good physical characteristics even at extreme temperatures, including both high and low temperatures. For instance, the thermoplastic composition can have a notched Charpy impact strength of about 6 $kJ/m^2$ or greater, or about 7 $kJ/m^2$ or greater at a temperature of −30° C. Upon dynamic crosslinking, the thermoplastic composition can exhibit a higher low temperature notched Charpy impact strength, for instance about 10 $kJ/m^2$ or greater, or about 12 $kJ/m^2$ or greater at a temperature of −30° C. Low temperature notched Charpy impact strength may be determined according to ISO Test No. 179-1.

The thermoplastic composition can exhibit very good tensile characteristics. Tensile characteristics can be determined according to ISO Test No. 527 at a temperature of 23° C. and a test speed of 5 mm/min or 50 mm/min (technically equivalent to ASTM D623 at 23° C.). For example, the composition can have a relatively low tensile modulus. For instance, the thermoplastic composition can have a tensile modulus less than about 2400 megapascals (MPa), less than about 2200 MPa, or less than about 2100 MPa. Upon dynamic crosslinking, the thermoplastic composition can have an even lower tensile modulus, for instance less than about 2000 MPa.

The tensile break stress can generally be greater than about 40 MPa, greater than about 42 MPa, or greater than about 43 MPa. For instance, a dynamically crosslinked thermoplastic composition can have a tensile break stress of greater than about 44 MPa.

The tensile break strain can generally be about 25% or greater, or about 35% or greater. Upon dynamic crosslinking, the thermoplastic composition can have a higher tensile break strain, for instance about 40% or greater, about 45% or greater, about 50% or greater, or about 90% or greater.

The yield strain of the thermoplastic composition can generally be greater than about 5% or greater than about 6%. A dynamically crosslinked thermoplastic composition can exhibit a yield strain that is greater than about 8% or greater than about 9%.

The flexural characteristics of the composition can be determined according to ISO Test No. 178 (technically equivalent to ASTM D790) at a temperature of 23° C. and a testing speed of 2 mm/min. For example, the flexural modulus of the composition can be less than about 2400 MPa, less than about 2300 MPa, less than about 2200 MPa, or less than about 2100 MPa. In one embodiment, the dynamically crosslinked thermoplastic composition can exhibit a lower flexural modulus, for instance less than about 2000 MPa, or less than about 1975 MPa.

The deflection temperature under load of the thermoplastic composition can be relatively high. For example, the deflection temperature under load of the composition can be greater than about 98° C., greater than about 99° C., or greater than about 100° C., as determined according to ISO Test No. 75-2 (technically equivalent to ASTM D790) at 1.8 MPa.

The thermoplastic composition can also exhibit good processing characteristics, for instance as demonstrated by the melt viscosity of the composition. For instance, the thermoplastic composition can have a melt viscosity of less than about 3000 poise, less than about 2500 poise, or less than about 2000 poise as measured on a capillary rheometer at 316° C. and 1200 sec$^{-1}$ with the viscosity measurement taken after five minutes of constant shear. Moreover, the thermoplastic composition can exhibit improved melt stability over time.

FIG. 1 illustrates a schematic of a process that can be used in forming the thermoplastic composition. As illustrated, the components of the composition may be melt-kneaded in a melt processing unit such as an extruder 100. Extruder 100 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 100 that includes multiple zones or barrels. In the illustrated embodiment, extruder 100 includes 10 barrels numbered 21-30 along the length of the extruder 100, as shown. Each barrel 21-30 can include feed lines 14, 15, 16, vents 12, temperature controls, etc. that can be independently operated. A general purpose screw design can be used to melt process the polyarylene composition. By way of example, a thermoplastic composition may be melt mixed using a twin screw extruder such as a Coperion co-rotating fully intermeshing twin screw extruder.

In forming a thermoplastic composition, the polyarylene sulfide can be fed to the extruder 100 at a main feed throat 14. For instance, the polyarylene sulfide may be fed to the main feed throat 14 at the first barrel 21 by means of a metering feeder. The polyarylene sulfide can be melted and mixed with the other components of the composition as it progresses through the extruder 100. The impact modifiers and crosslinker(s) can be added to the composition in conjunction with the thermoplastic composition at the main feed throat 14 or downstream of the main feed throat, as desired. In addition, the impact modifiers and crosslinker(s) may be added in conjunction with one another or separately.

The polyarylene sulfide may be a polyarylene thioether containing repeat units of the formula (I):

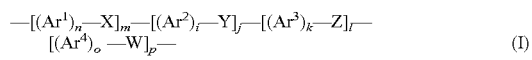

$$—[(Ar^1)_n—X]_m—[(Ar^2)_i—Y]_j—[(Ar^3)_k—Z]_l— \\ [(Ar^4)_o—W]_p— \quad (I)$$

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be synthesized prior to forming the thermoplastic composition, though this is not a requirement of a process, and a polyarylene sulfide can be purchased from known suppliers. For instance Fortron® polyphenylene sulfide available from Ticona of Florence, Ky., USA can be purchased and utilized as a polyarylene sulfide.

Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalo-diphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

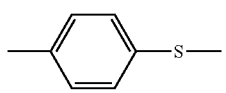
(II)

and segments having the structure of formula (III):

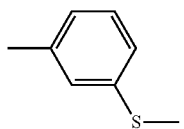
(III)

or segments having the structure of formula (IV):

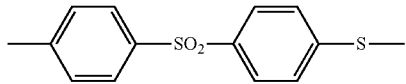
(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The thermoplastic composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the thermoplastic composition. For instance, the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of 1200 s$^{-1}$ and at a temperature of 310° C.

According to one embodiment, the polyarylene sulfide can be functionalized to encourage bond formation within the thermoplastic composition. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the thermoplastic composition formation process, and the polyarylene sulfide can be functionalized in conjunction with formation of the composition. For instance, a disulfide compound containing the desired reactive functional group(s) can be added to the melt extruder in conjunction with the polyarylene sulfide.

Reaction between the polyarylene sulfide polymer and the reactively functionalized disulfide compound can include chain scission of the polyarylene sulfide polymer, which can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be more amenable to certain types of processing, and the overall halogen content of the low melt viscosity polyarylene sulfide can be quite low as compared to a typical low melt viscosity polyarylene sulfide. A thermoplastic composition that exhibits excellent absorption resistance in addition to low halogen content can be advantageous as low halogen content polymeric materials are becoming increasingly desired due to environmental concerns. In one embodiment, the thermoplastic composition can have a halogen content of less than about 1000 ppm, less than about 900 ppm, less than about 600 ppm, or less than about 400 ppm as determined according to an elemental analysis using Parr Bomb combustion followed by on Chromatography.

A disulfide compound can generally have the structure of:

$$R^1\!-\!S\!-\!S\!-\!R^2$$

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In one embodiment, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

In one embodiment, the disulfide compound may include nonreactive functionality at the terminal ends. In this embodiment, the disulfide compound can serve to lower the melt viscosity of the thermoplastic composition and provide a low-halogen content composition without increasing bonding with the polyarylene sulfide. For instance, the $R^1$ and $R^2$ groups may be the same or different and may be nonreactive groups independently selected from the group consisting of alkyl, cycloalkyl, aryl, and heterocyclic groups of 1 to about 20 carbon atoms. Examples of disulfide compounds including nonreactive terminal groups as may be included in a disulfide solution include, without limitation, diphenyl disulfide, naphthyl disulfide, dimethyl disulfide, diethyl disulfide, dipropyl disulfide, di(benzothiazol-2-yl) disulfide, and the like.

The ratio of the amount of the polyarylene sulfide to the amount of the disulfide compound can be from about 1000:1 to about 10:1, from about 500:1 to about 20:1, or from about 400:1 to about 30:1.

The composition can also include at least two impact modifiers. In one embodiment, one of the impact modifiers can be a homopolymer of ethylene or a copolymer of ethylene. For instance one of the impact modifiers can be a copolymer of ethylene with relatively small amounts (e.g., about 20 wt. % or less, about 10 wt. % or less, or about 5 wt. % or less) of an olefin copolymerizable therewith. Exemplary copolymers can include ethylene copolymerized with, without limitation, alpha alkenes having 3 to about 8 carbon atoms in the chain such as propylene, butene, 2-methyl-1-propene, 4-methyl-1-pentene, 2,4,4-trimethyl-1-pentene, etc.

In one embodiment, a polyethylene impact modifier can be a high molecular weight polyethylene homopolymer or copolymer or an ultrahigh molecular weight polyethylene homopolymer or copolymer. As utilized herein, high molecular weight polyethylene generally refers to a polyethylene polymer having a number average molecular weight of from about 200,000 to about 500,000, which can be calculated by use of Margolies' equation. The term ultrahigh molecular weight polyethylene generally refers to a polyethylene polymer having a number average molecular weight of greater than about 500,000, for instance from about 500,000 to about 3,000,000 as determined according to ASTM 4020.

A high molecular weight and/or ultrahigh molecular weight polyethylene homopolymer or copolymer can be included in the composition in the form of particles. For instance, polyethylene particles for use in the composition can have a mean particle diameter $D_{50}$ ranging from about 5 µm to about 1000 µm. In one embodiment, the mean particle diameter of the polyethylene particles is about 500 microns or less, such as about 400 microns or less, or about 300 microns or less. For example, in one embodiment, the mean particle diameter can be from about 20 microns to about 300 microns, such as from about 50 microns to about 250 microns. The particle size can be determined via a laser diffraction method according to ISO testing method 13320.

High molecular weight and/or ultrahigh molecular weight polyethylene particles can have a spherical shape or an irregular shape. As used herein, an irregular shape refers to a particle that is non-spherical and may contain lobes and/or hills and valleys. For instance, the particles may have a popcorn-like shape. In one embodiment, irregular-shaped particles are incorporated into the thermoplastic composition. Without wishing to be bound to any particular theory, it is believed that higher crosslinking density may occur within the composition when using irregular-shaped particles.

A polyethylene can have a bulk density from about 0.1 to about 1.5 grams per cubic centimeter (g/cc) as determined according to ISO testing method 1872-1. In one embodiment, the polyethylene can have a bulk density from about 0.15 g/cc to about 1.0 g/cc, or from about 0.2 g/cc to about 0.95 g/cc. The melt flow rate of the polyethylene can be from about 0.1 grams per 10 minutes (g/10 min) to about 5 g/10 min, from about 0.5 g/10 min to about 4.5 g/10 min, or from about 1 g/10 min to about 4 g/10 min as determined according to ASTM D1238 at 190° C. under 21.6 kilograms pressure. The viscosity of the polyethylene can generally be from about 50 cubic centimeters per gram (cm³/g) to about 1000 cm³/g, for instance from about 100 cm³/g to about 800 cm³/g, or from about 200 cm³/g to about 500 cm³/g. Melt viscosity can be determined according to ISO testing method 11443 at 350° C. and a shear rate of 400 s$^{-1}$ and 1000 s$^{-1}$.

The melting temperature of the polyethylene will depend upon the characteristics of the polymer, such as molecular weight and degree of branching. The melting temperature of a high molecular weight polyethylene will typically be in the range of about 100° C. to about 145° C. Ultrahigh molecular weight polyethylene does not have a melting point per se, but can be considered as the crystalline melting temperature of the polymer, which is known to those of skill in the art as the peak temperature in a differential scanning calorimetry (DSC) scan. The crystalline melting temperature of ultrahigh molecular weight polyethylene homopolymers or copolymers can typically be in the range of about 100° C. to about 145° C. With regard to other thermal properties of the polyethylene, the Vicat softening point of the polyethylene can from about 50° C. to about 100° C. as determined according to ISO test method 11357-1,2,3, the specific heat capactity of the polyethylene can be from about 1.5 Joules per gram ° C. (J/g–° C.) to about 2.0 J/g–° C., and the UL94 flammability rating can be HB (1.6 mm nominal thickness).

The tensile properties of the polyethylene can be determined according to ISO test method 527-2/1A at a testing temperature of 23° C. and a testing speed of 50 mm/min. For instance, the tensile stress at yield can be between about 10 megapascals (MPa) and about 30 MPa, for instance between about 12 MPa and about 20 MPa. The tensile strain at yield can be between about 3% and about 50%, for instance between about 5% and about 40% or between about 8% and about 20%, and the tensile strain at break can be greater than about 50%.

The high molecular weight and/or ultrahigh molecular weight polyethylene can be prepared according to methods as are generally known in the art or may be purchased. For instance, suitable polyethylene materials are available from Ticona Engineering Polymers of Florence, Ky. For instance Ticona GUR high molecular weight and/or ultrahigh molecular weight polyethylenes can be utilized such as Ticona GUR® GHR polyethylenes.

In one embodiment, the polyethylene can be formed by the catalytic polymerization of ethylene, optionally with one or more other alpha-olefin comonomers as stated above, using a mixed catalyst that includes a heterogeneous catalyst and a co-catalyst. The heterogeneous catalyst can be a Ziegler-Natta type catalyst, which is typically a halide of a transition metal from Groups IV-VIII of the Periodic Table reacted with an alkyl derivative of a metal or hydride from Groups I-III.

For instance, the heterogeneous catalyst can be formed via reaction of a titanium (IV) compound with an alkyl aluminum compound to form a titanium (III) heterogeneous catalyst. Titanium (IV) compounds can include those having the general formula $$Ti(OR^3)_{4-a}X_a$$

in which:
a is an integer from 1 to 4;
each $R^3$ is independently a hydrocarbon radical having 1 to about 18 carbon atoms; and
X is halogen.

Examples of titanium (IV) compounds can include, without limitation, $TiCl_4$, $TiBr_4$, $Ti(OC_2H_5)Cl_3$, $Ti(OC_5H_7)Cl_3$, and $Ti(O\text{-}i\text{-}C_4H_9)Cl_3$.

Alkyl aluminum compounds that may be reacted with the titanium (IV) compound can include those of the general formula:

$$AlR^4_{3-b}X_b$$

in which
b is 0, 1 or 2;
each $R^4$ is independently an alkyl radicals having 1 to about 12 carbon atoms; and
X is halogen.

Examples of alkyl aluminum compounds can include, without limitation, triethylaluminum, triisobutylaluminum, diethylaluminum chloride, and ethylaluminum dichloride. Polymeric aluminum compounds that can be obtained from the reaction of lithium aluminum hydride, trialkylaluminum, or dialkylaluminum hydride, the alkyl radicals of which each have 1 to 16 carbon atoms, with diolefins having from about 4 to about 20 carbon atoms, can also be utilized. In one embodiment, the reaction product of Al(i-C$_4$H$_9$)$_3$ or Al(i-C$_4$H$_9$)$_2$H with isoprene can be used. A single alkyl aluminum compound may be used alone or mixtures of two or more compounds may be used.

Reaction of the titanium (IV) compound with the alkyl aluminum compound can carried out in an inert solvent at temperatures of about −40° C. to about 140° C., for instance about −20° C. to about 120° C. The concentration of the reactants can be about 0.1 to about 9.1 mol of the titanium (IV) compound per liter of solvent and about 0.05 to about 1.0 mol of the alkyl aluminum compound per liter of solvent. The solvent can be, e.g., an aliphatic hydrocarbon or mixture thereof such as butane, pentane, hexane, cyclohexane, nonane, decane, or higher homologues and mixtures thereof.

The heterogeneous catalyst can be filtered out of suspension, washed with the solvent or suspending medium, and suspended again in an inert organic solvent prior to utilization in conjunction with the co-catalyst. Alternatively, the suspension including the reaction product heterogeneous catalyst can also be used directly. The heterogeneous catalyst can be unsupported or can be supported on silica, magnesium chloride and other porous fine grained materials. In one embodiment, the heterogeneous catalysts can have a particle size, $D_{50}$, of from about 10 mm to about 60 mm, for instance from about 15 mm to about 40 mm.

The heterogeneous catalyst can be combined with an alkyl aluminum co-catalyst to form the mixed catalyst, for instance by suspending the heterogeneous catalyst in an organic solvent and then contacting the heterogeneous catalyst with the alkyl aluminum co-catalyst. The alkyl aluminum co-catalyst can include mononuclear or polynuclear mono- or dialkylaluminum halides, and trialkylaluminum compounds such as, without limitation, triisobutylaluminum, triethylaluminum, isoprenylaluminum, aluminoxanes and halide-containing species and mixtures thereof.

Generally, the atomic ratio of aluminum to titanium in the mixed catalyst can be from about 0.001:1 to about 200:1, from about 1:1 to about 15:1 or from about 2:1 to about 10:1.

The polymerization may be conducted in the gaseous phase in the absence of a solvent or, alternatively, in the slurry phase in the presence of an organic diluent. Suitable diluents include, e.g., butane, pentane, hexane, cyclohexane, nonane, decane, or higher homologues and mixtures thereof. The polymerization reaction can be carried out in suspension in one or more stages, continuously or batchwise. For example, in forming a polymer with a bimodal molecular weight distribution, the higher molecular weight fraction can be formed in a first step followed by a second step to produce the lower molecular weight fraction within individual higher molecular weight polymer particles.

The polymerization can generally be carried out at a temperature of from about 30° C. to about 130° C., for instance from about 50° C. to about 100° C., or from about 50° C. to about 90° C. and at an ethylene pressure in the range of between about 0.05 and about 50 MPa, such as between about 0.05 and about 10 MPa, typically between about 0.05 and about 2 MPa.

The molecular weight of the polyethylene may be controlled by feeding hydrogen to the polymerization reactor. For example, the amount of hydrogen added can be such that the ratio of hydrogen to ethylene in the reactor feed is from about 0.5 vol.% to about 100 vol. % hydrogen per MPa ethylene, for instance from about 2 vol.% to about 20 vol. % hydrogen/MPa ethylene for a single step reaction.

The polymerization time is generally from about 1 hour to about 12 hours, for instance from about 2 hours to about 9 hours. The overall catalyst consumption in the polymerization can be from about 0.01 millimoles titanium per kilogram of polymer (mmol Ti/kg) to about 1 mmol Ti/kg, for instance from about 0.02 mmol Ti/kg to about 0.6 mmol Ti/kg.

Following polymerization, the ethylene polymer can be isolated and dried, for instance in a fluidized bed drier under nitrogen. Any remaining high boiling point solvent can be removed by steam distillation. Additives may be included with the polyethylene as is known. For instance, salts of long chain fatty acids may be added to the polyethylene as a stabilizer. Non-limiting examples of salts of long chain fatty acids can include calcium, magnesium and zinc stearate. Additional additives may be included with the polyethylene such as lubricants, dyes, pigments, antioxidants, fillers, processing aids, light stabilizers, neutralizers, antiblock, etc.

In one embodiment, the polyethylene may remain unmodified. In one embodiment, the polyethylene may be modified, for instance by surface treatment of the polyethylene particles to include functional groups on the particle surface. By surface treating the particles, polyethylene crosslinking may occur throughout the thermoplastic composition. One exemplary surface treatment method is plasma treatment that can be used to oxidize the surface of the polyethylene particles, optionally in the presence of other materials to form particular functionality on the polyethylene particle surface. Functional groups that can be formed on a polyethylene particle surface may include, without limitation, —OH (hydroxy), —OOH (hydroperoxo), —NH$_2$ (amino), —COOH (carboxyl), —COOOH (peracid), —CHO (aldehyde), etc. The degree of functionalization on the surface of the polyethylene particle can be adjusted by the time and the conditions of the treatment as well as the particle size of the polyethylene particles, as is known.

Solution functionalization methods can be utilized. For example, the surface of polyethylene particles can be treated with a solution comprising 1 to 99.9% by weight of at least one water soluble wetting agent and 0.1 to 99% by weight of at least one water insoluble wetting agent. A water soluble wetting agent can be, for example, a water-soluble surfactant or water-soluble polyalkylene glycol including, without limitation, anionic, cationic, and nonionic surfactants including anionic surfactants that contain carboxylate, sulfonate, or sulfate groups. A water insoluble wetting agent can include, without limitation, a water-insoluble polyalkylene glycol and the corresponding water insoluble mono- or di-alkyl, branched or unbranched, ethers of 1 to 13 carbon atoms. By way of example, polypropylene glycols and/or the corresponding mono- or diethers having from 4 to 44 propylene glycol recurring units in the main polymer chain can be used. The surface treated polyethylene can exhibit modified hydrophilicity as compared to the pretreated polymer.

In another embodiment the surface of a polyethylene particle can be functionalized by reacting the surface of the particle with a monomer that includes an unsaturated group that is capable of reacting with the surface and attaching the monomer to the surface. The monomer can be reacted with the surface by irradiation, i.e. with an electron beam.

A functionalized polyethylene may be characterized by having an acid number of greater than about 0.5 mg KOH/g, for instance greater than about 1.0 mg KOH/g, or from about 1.5 mg KOH/g to about 20 mg KOH/g as determined according to ASTM D 1386. The acid number may provide a measure of the extent of hydrophilization or oxidation of the polyethylene particle.

When present, the polyethylene impact modifier can be present in the thermoplastic composition in an amount greater than about 2% by weight, in an amount greater than about 3% by weight, or in an amount greater than about 4% by weight. For example, the polyethylene can be present in the composition in an amount less than about 30% by weight, in an amount less than about 28% by weight, in an amount less than about 25% by weight, or in an amount less than about 20% by weight.

Referring again to FIG. 1, the polyethylene can be added to the composition in conjunction with the polyarylene sulfide at the main feed throat 14 of the melt processing unit. This is not a requirement of the composition formation process, however, and in other embodiments, the polyethylene can be added downstream of the polyarylene sulfide. For instance, the polyethylene may be added at a location downstream from the point at which the polyarylene sulfide is supplied to the melt processing unit, but yet prior to the melting section, i.e., that length of the melt processing unit in which the polyarylene sulfide becomes molten. In another embodiment, the polyethylene may be added at a location downstream from the point at which the polyarylene sulfide becomes molten.

Another impact modifier that may be incorporated in the thermoplastic composition is an olefinic copolymer or terpolymer. An olefinic copolymer or terpolymer impact modifier can include ethylenically unsaturated monomer units have from about 4 to about 10 carbon atoms.

A non-limiting listing of olefinic copolymer or terpolymer impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

This impact modifier may be a linear or branched, may be a homopolymer or copolymer (e.g., random, graft, block, etc.) and/or may contain epoxy functionalization, e.g., terminal epoxy groups, skeletal oxirane units, and/or pendent epoxy groups. For instance, this impact modifier may be a copolymer including at least one monomer component that includes epoxy functionalization. The monomer units of the impact modifier may vary. In one embodiment, for example, this impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of an olefinic copolymer or terpolymer impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the olefinic impact modifier can be a terpolymer that includes epoxy functionalization. For instance, the impact modifier can include a methacrylic component that includes epoxy functionalization, an α-olefin component, and a methacrylic component that does not include epoxy functionalization. For example, the Impact modifier may be poly(ethylene-co-methylacrylate-co-glycidyl methacrylate), which has the following structure:

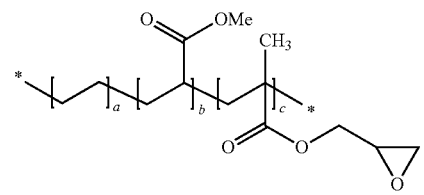

wherein, a, b, and c are 1 or greater.

In another embodiment the impact modifier can be a random copolymer of ethylene, ethyl acrylate and maleic anhydride having the following structure:

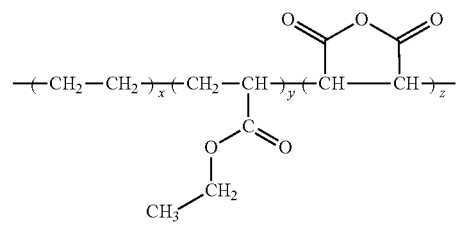

wherein x, y and z are 1 or greater.

The relative proportion of the various monomer components of an olefinic copolymeric impact modifier is not particularly limited. For instance, in one embodiment, epoxy-functional methacrylic monomer components can form from about 1 wt. % to about 25 wt. %, or from about 2 wt. % to about 20 wt % of the copolymeric impact modifier. An α-olefin monomer unit can form from about 55 wt. % to about 95 wt. %, or from about 60 wt. % to about 90 wt. %, of an olefinic copolymeric impact modifier. When employed, other monomeric components (e.g., non-epoxy functional methacrylic monomers) may constitute from about 5 wt. % to about 35 wt. %, or from about 8 wt. % to about 30 wt %, of an olefinic copolymeric impact modifier.

An olefinic copolymeric or terpolymeric impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an olefinic copolymeric or terpolymeric impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In one embodiment, the olefinic copolymeric or terpolymeric impact modifier can be modified to include functionalization. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

In general, an olefinic copolymeric or terpolymeric impact modifier may be present in the composition in an amount from about 0.05% to about 40% by weight, from about 0.05% to about 37% by weight, or from about 0.1% to about 35% by weight. For instance, the thermoplastic composition can include an olefinic copolymeric or terpolymeric impact modifier in an amount of less than about 30% by weight, less than about 25% by weight, or less than about 20% by weight.

A siloxane polymer may be included in the thermoplastic composition as one of the impact modifiers. The siloxane polymer can encompass any polymer, copolymer or oligomer that includes siloxane units in the backbone having the formula:

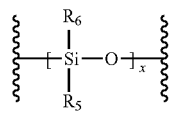

wherein $R_5$ and $R_6$ are independently of one another, hydrogen, alkyl, alkenyl, acyl, alkaryl or aralkyl having up to 20 carbon atoms. In one embodiment the siloxane polymer includes reactive functionality on at least a portion of the siloxane monomer units of the polymer. The backbone of the siloxane polymer can include substitutions as are known in the art such as alkyl substitutions, phenyl substitutions, etc.

Some examples of suitable siloxane polymers include, without limitation, polydimethyl siloxanes such as dimethylvinylsiloxy end group-capped polydimethyl siloxane, methyldivinylsiloxy end group-capped polydimethyl siloxane, dimethylvinylsiloxy end group-capped dimethyl siloxane, (80 mol %)/methylphenylsiloxane (20 mol %) copolymers, dimethylvinylsiloxy end group-capped dimethylsiloxane (80 mol %)/diphenylsiloxane (20 mol %) copolymers, dimethylvinylsiloxy end group-capped dimethylsiloxane (90 mol %)/diphenylsiloxane (10 mol %) copolymers, and trimethylsiloxy end group-capped dimethylsiloxane/methylvinylsiloxane copolymers. Besides the above-mentioned polymers, other polymers may also be utilized. For instance, some suitable vinyl-modified silicones include, but are not limited to, vinyldimethyl terminated polydimethylsiloxanes; vinylmethyl, dimethylpolysiloxane copolymers; vinyldimethyl terminated vinylmethyl, dimethylpolysiloxane copolymers; divinylmethyl terminated polydimethylsiloxanes; polydimethylsiloxane, mono vinyl, mono n-butyldimethyl terminated; and vinylphenylmethyl terminated polydimethylsiloxanes. Further, some methyl-modified silicones that can be used include, but are not limited to, dimethylhydro terminated polydimethylsiloxanes; methylhydro, dimethylpolysiloxane copolymers; methylhydro terminated methyloctyl siloxane copolymers; and methylhydro, phenylmethyl siloxane copolymers.

When included, the reactive functionality of the siloxane polymer can include, without limitation, one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, and the like.

The siloxane polymer can have any desired molecular weight. For example, in one embodiment, the siloxane polymer can have a molecular weight of greater than about 5000. In one embodiment, a high molecular weight siloxane polymer can be incorporated in the thermoplastic composition, e.g., a high molecular weight polydimethylsiloxane that can have more than about 200 —$(CH_3)_2SiO$— repeating units along the backbone. In another embodiment, an ultrahigh molecular weight siloxane polymer, e.g., an ultrahigh molecular weight polydimethylsiloxane can be incorporated in the thermoplastic composition that can have a number average molecular weight of about $10^6$ grams per mole or greater.

In one embodiment, the siloxane polymer can be epoxy-functionalized and can include epoxy groups incorporated into the siloxane polymer having the formula:

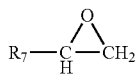

wherein $R_7$ is a divalent aliphatic ($C_1$-$C_{10}$), cycloalkyl($C_5$-$C_{20}$) heterocyclic ($C_4$-$C_9$), substituted or unsubstituted aromatic ($C_6$-$C_9$) hydrocarbon radical or a direct bond.

The epoxy groups can be incorporated onto an amine-functionalized or amino-terminated siloxane. For instance, an amine-terminated siloxane polymer such as those available commercially as the "G series" siloxane resins available from the General Electric Company can be reactively functionalized with epoxy. Epoxy functionalization may be carried out via reaction with an epoxy-containing compound such as an epoxy chlorotriazine as is known.

One example of a suitable epoxy chlorotriazine as may be utilized is trimethylglycidyl cyanuric chloride.

Reaction between the epoxy chlorotriazine and the siloxane may be conducted in an organic solvent such as toluene, methylene chloride, or other organic liquid of similar polarity. Reaction temperatures in the range of about 20° C. to about 100° C. may be employed. Excess amounts of the epoxy chlorotriazine are typically employed, which fall in the range of between about 1% and about 6% or between about 2% and about 6% by weight of the siloxane polymer.

A siloxane polymer can be mercapto-functionalized and can include mercapto groups incorporated into the siloxane polymer having the formula:

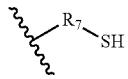

wherein $R_7$ is as described above. For example, the siloxane polymer can be a mercapto-functionalized polydimethyl siloxane having the general formula:

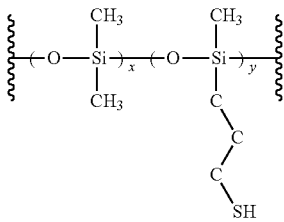

When incorporated in the thermoplastic composition, the composition can include a siloxane polymer in an amount of about 40 wt. % or less of the thermoplastic composition. For instance, the thermoplastic composition can include a siloxane polymer in an amount of from about 0.05 wt. % to about 35 wt. %, or about 0.1 wt. % to about 30 wt. %. A siloxane polymer can be incorporated in the thermoplastic composition at any point during the formation process, for instance in the main feed in conjunction with the polyarylene sulfide or downstream.

In combination with a siloxane polymer impact modifier, the thermoplastic composition can include fumed silica. Fumed silica can generally have a particle size of from about 5 nanometers to about 50 nanometers. The particles are non-porous and can have a surface area of from about 50 square meters per gram (m²/g) to about 600 m²/g and a density of from about 160 kilogram per cubic meter (kg/m³) to about 190 kg/m³. When incorporated in the thermoplastic composition, the composition can include fumed silica in an about of less than about 25 wt. %, for instance from about 0.05 wt % to about 20 wt. %. In one embodiment, the fumed silica can be combined with the siloxane polymer prior to addition of this mixture to the thermoplastic composition. For instance a preformed mixture including an ultrahigh molecular weight polydimethylsiloxane and fumed silica can be incorporated in the thermoplastic composition. Such a pre-formed mixture is available as Genioplast® from Wacker Chemie, AG.

The thermoplastic composition can incorporate a thermoplastic elastomer as one of the impact modifiers. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on injection molders and extruders and thus can be beneficially incorporated in the thermoplastic composition.

A thermoplastic elastomer impact modifier can be a block copolymer in which at least one phase is made of a material that is hard at room temperature but fluid upon heating. Another phase is a softer material that is rubber-like at room temperature. The thermoplastic elastomer impact modifier can have an A-B-A block copolymer structure, where A represents hard segments and B is a soft segment. In another embodiment, the thermoplastic elastomer can have a repeating structure represented by $(A-B)_n$, where A represents the hard segments and B the soft segments as described above.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock elastomers can be utilized with polystyrene as the hard segment and either polybutadiene, polyisoprene, or polyethylene-co-butylene as the soft segment. Similarly, styrene butadiene repeating co-polymers can be utilized, as well as polystyrene/polyisoprene repeating polymers.

In one particular embodiment, a thermoplastic elastomer can be used as one of the impact modifiers that has alternating blocks of polyamide and polyether. Such materials are commercially available, for example from Atofina under the Pebax™ trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

When included, the thermoplastic composition can include the thermoplastic elastomer impact modifier in an amount of about 40 wt. % or less of the thermoplastic composition. For instance, the thermoplastic composition can include the thermoplastic elastomer impact modifier in an amount of from about 0.05 wt. % to about 35 wt. %, or about 0.1 wt. % to about 30 wt. %.

Beneficially, the inclusion of at least two impact modifiers in the thermoplastic composition can provide a route to lower concentrations of each impact modifier as compared to a similar thermoplastic composition that include only one of the impact modifiers.

Referring again to FIG. 1, the impact modifiers can be added to the composition in conjunction with the polyarylene sulfide at the main feed throat 14 of the melt processing unit. This is not a requirement of the composition formation process, however, and in other embodiments, at least one of the impact modifiers can be added downstream of the main feed throat, as designated by input line 16 on FIG. 1. When multiple impact modifiers are added downstream, the impact modifiers may be added separately or together. For instance, at least one impact modifiers may be added at a location downstream from the point at which the polyarylene sulfide is supplied to the melt processing unit, but yet prior to the melting section, i.e., that length of the melt processing unit in which the polyarylene sulfide becomes molten. In another embodiment, at least one of the impact modifiers may be added at a location downstream from the point at which the polyarylene sulfide becomes molten.

In those embodiments in which one or more of the impact modifiers are added to the melt processing unit downstream of the main feed of the polyarylene sulfide, the impact modifier(s) may be mixed with a small amount of a polyarylene sulfide (either the same or different as the polyarylene sulfide added at the main feed location) prior to addition to the composition. For instance, about 90% by weight or more of the polyarylene sulfide can be added at a first location and the remainder of the polyarylene sulfide may be mixed with one or both of the impact modifiers for addition to the melt processing unit.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In one embodiment, in addition to the polyarylene sulfide and at least two impact modifiers, the thermoplastic composition can include one or more crosslinking agents, each of which being capable of crosslinking at least one of the impact modifiers. In one embodiment, a crosslinking agent can be added to the composition downstream of the addition point of the impact modifiers. Without being bound to any particular theory, it is believed that by adding a crosslinking agent to the composition following distribution of the impact modifiers throughout the polyarylene sulfide, interaction between the polyarylene sulfide, the crosslinking agent, and the impact modifier that can be crosslinked by the agent within the melt processing unit can be improved, leading to improved distribution of crosslinking between and among the various additives of the composition. The improved distribution of crosslinks throughout the composition can improve the strength and flexibility characteristics of the composition, e.g., the ability of the composition to maintain strength under deformation.

The crosslinking agent can be a polyfunctional compound that can react with functionality of components of the composition to form crosslinks within and among the additives. Moreover, and depending upon the existence and chemistry of reactive functionality of the multiple impact modifiers, a single crosslinking agent may be used or a combination of crosslinking agents may be used in those embodiments in which multiple impact modifiers are to be crosslinked in the thermoplastic composition. In general, the crosslinking agent(s) can be non-polymeric, i.e., a molecular compound that includes two or more reactively functional terminal moieties linked by a bond or a non-polymeric (non-repeating) linking component. By way of example, a crosslinking agent can include but is not limited to diepoxides, polyfunctional epoxides, diisocyanates, polyisocyanates, polyhydric alcohols, water-soluble carbodiimides, diamines, diaminoalkanes, polyfunctional carboxylic acids, diacid halides, and so forth. For instance, when considering a thermoplastic composition including an epoxy-functionalized impact modifier and a polyethylene homopolymer or copolymer impact modifier, a non-polymeric polyfunctional carboxylic acid or amine can be utilized as a single crosslinking agent that can crosslink both impact modifiers.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the thermoplastic composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with at least one of the impact modifiers as well as with the reactively functionalized polyarylene sulfide. Thus, the composition can be highly crosslinked without excessive scission of the polyarylene sulfide polymer chains.

In another embodiment both the crosslinking agent and the disulfide compound utilized to functionalize the polyarylene sulfide (when utilized) can be selected so as to encourage chain scission of the polyarylene sulfide. This may be beneficial, for instance, in those embodiments in which chain scission is desired to decrease the melt viscosity of the polyarylene sulfide.

When present, the thermoplastic composition may generally include the crosslinking agent in an amount from about 0.05 wt. % to about 2 wt. % by weight of the thermoplastic composition, from about 0.07 wt. % to about 1.5 wt. % by weight of the thermoplastic composition, or from about 0.1 wt. % to about 1.3 wt. %.

The crosslinking agent can be added to the melt processing unit following mixing of the polyarylene sulfide and the impact modifiers. For instance, as illustrated in FIG. 1, the crosslinking agent can be added to the composition at a downstream location 15 following addition of polyarylene sulfide and the impact modifiers (either together or separately) to the melt processing unit. This can ensure that the impact modifiers have become dispersed throughout the polyarylene sulfide prior to addition of the crosslinking agent.

To help encourage distribution of the impact modifiers throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and additive distribution. For example, the L/D value after the point(s) at which the impact modifiers are supplied may be controlled to encourage distribution of the additives. More particularly, the screw has a blending length ("$L_B$") that is defined from the point at which all of the impact modifiers and the polyarylene sulfide are supplied to the unit (i.e., either where they are all supplied in conjunction with one another or the point at which the last of the component is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the $L/L_B$ ratio can be from about 40 to about 1.1, from about 20 to about 2, or from about 10 to about 5.

The composition can also include one or more additives as are generally known in the art. For example, one or more fillers can be included in the thermoplastic composition. One or more fillers may generally be included in the thermoplastic composition an amount of from about 5 wt. % to about 70 wt. %, or from about 20 wt. % to about 65 wt. % by weight of the thermoplastic composition.

The filler can be added to the thermoplastic composition according to standard practice. For instance, the filler can be added to the composition at a downstream location of the melt processing unit. For example, a filler may be added to the composition in conjunction with the addition of another additive. However, this is not a requirement of a formation process and the filler can be added separately from all other additives and either upstream or downstream of the point of addition of the other additives. In addition, a filler can be added at a single feed location, or may be split and added at multiple feed locations along the melt processing unit.

In one embodiment, a fibrous filler can be included in the thermoplastic composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm. The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the thermoplastic composition. In general, particulate fillers can encompass a particulate material having a median particle size of about 750 μm or less, for instance about 500 μm or less, or about 100 μm or less. In one embodiment, a particulate filler can have a median particle size in the range of from about 3 μm to about 20 μm. In addition, a particulate filler can be solid or hollow, as is known. Particulate fillers can also include a surface treatment, as is known in the art.

Particulate fillers can encompass one or more mineral fillers. For instance, the thermoplastic composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the thermoplastic composition can include a UV stabilizer as an additive. For instance, the thermoplastic composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a thermoplastic composition is one or more colorants as are generally known in the art. For instance, the thermoplastic composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, 3$^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes.

Pigments that can be incorporated in a thermoplastic composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the thermoplastic composition can encompass, without limitation, antimicrobials, lubricants, antioxidants, stabilizers (e.g., heat stabilizers including organophosphites such as Doverphose® products available from Dover Chemical Corporation), surfactants, flow promoters, solid solvents, flame retardants, nucleating agents, and other materials added to enhance properties and processability. Such optional materials may be employed in the thermoplastic composition in conventional amounts and according to conventional processing techniques, for instance through addition to the thermoplastic composition at the main feed throat. Beneficially, the thermoplastic composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the thermoplastic composition, the composition is thoroughly mixed in the remaining section(s) of the extruder during which crosslinking of the composition can occur, and extruded through a die. The final extrudate can be pelletized or other wise shaped as desired, for instance the final extrudate can be in the form of a pultruded tape or ribbon.

Conventional shaping processes can be used for forming articles out of the thermoplastic composition including, without limitation, extrusion, injection molding, blow-molding, thermoforming, foaming, compression molding, hot-stamping, fiber spinning and so forth. Shaped articles that may be formed may include structural and non-structural shaped parts.

Tubular members as may be utilized for carrying liquids or gases, and in one particular embodiment for carrying hydrocarbons, may be formed from the thermoplastic composition. For instance tubular members including hoses, pipes, conduits and the like can be formed from the thermoplastic composition. The tubular members may be single-layered or multi-layered. Typical conventional extrusion or molding processes may be used for forming the tubular members. For instance, either single or multi-screw extruders may be used for extrusion of the tubing. In another embodiment, a blow molding process may be utilized in forming a tubular hollow member.

A component can include the thermoplastic composition throughout the entire component or only a portion of the component. For instance, when considering a component having a large aspect ratio (L/D>1), such as a tubular member, the component can be formed such that the thermoplastic composition extends along a section of the tubular member and an adjacent section can be formed of a different composition, for instance a different thermoplastic composition. Such a component can be formed by, e.g., altering the material that is fed to a molding device during a formation process. The component can include an area in which the two materials are mixed that represents a border region between a first section and a second section formed of different materials. A component can include a single section formed of the thermoplastic composition or a plurality of sections, as desired. Moreover, other sections of a component can be formed of multiple different materials.

Referring to FIG. 2, one embodiment of a tubular member 110 formed from the thermoplastic composition is shown. As shown, the tubular member 110 extends in multiple directions leading to a relatively complex shape. For instance, before the thermoplastic composition can solidify, the angular displacements as shown in FIG. 2 can be formed into the part. The tubular member 110 includes angular displacement changes at 112, 114 and 116.

According to one embodiment, the tubular member such as the tubular member 110 illustrated in FIG. 2 can be a single layer tubular member formed according to a blow molding process.

During blow molding, the thermoplastic composition is first heated and extruded into a parison using a die attached to an extrusion device. When the parison is formed, the composition must have sufficient melt strength to prevent gravity from undesirably elongating portions of the parison and thereby forming non-uniform wall thicknesses and other imperfections. The parison is received into a molding device, generally formed of multiple sections that together form a three-dimensional mold cavity. For instance, a robotic arm can be utilized to manipulate the parison in the molding device.

As can be appreciated, a certain period of time elapses from formation of the parison to moving the parison into engagement with the molding device. During this stage of the process, the melt strength of the thermoplastic composition can be high enough such that the parison maintains its shape during movement. The thermoplastic composition can also be capable of remaining in a semi-fluid state and not solidifying too rapidly before blow molding commences.

Once the molding device is closed, a gas, such as an inert gas is fed into the parison from a gas supply. The gas supplies sufficient pressure against the interior surface of the parison such that the parison conforms to the shape of the mold cavity. After blow molding, the sections can be opened, and the finished shaped article is then removed. In one embodiment, cool air can be injected into the molded part for solidifying the thermoplastic composition prior to removal from the molding device.

A tubular member such as a pipe or a tube can be formed according to an extrusion process. For example, an extrusion process utilizing a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals, and the like.

When forming a product such as a tubular member according to an extrusion process, the thermoplastic composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens, and so forth. In general, the line speed can be from about 4 meters per minute to about 15 meters per minute. Of course, the actual line speed can depend upon the final dimension of the final product, the aesthetics of the final product and process stability.

The die swell during an extrusion process can generally be negligible. A draw down of about 1.2 to about 1.7 can generally be utilized, as a higher draw down can negatively affect the final properties of the product, depending on other processing conditions. Die drool can generally be avoided by drying the resin adequately prior to extrusion as well as by maintaining the melt temperature at less than about 304° C.

In one embodiment, tubular members extruded from the thermoplastic composition can have a wall thickness of between about 0.5 millimeters to about 5 millimeters, though tubular members having larger wall thickness can be formed from the composition as desired. The calibration ring inner diameter can decide the outer diameter of the tubular member and will generally be less than the outer diameter of the die, as is known. The inner diameter of the tubular member can be utilized to determine the desired outer diameter of the mandrel and the line speed, as is known.

A tubular member that incorporates the thermoplastic composition can be a multi-layered tubular member. FIG. 3 illustrates a multi-layered tubular member 210 as may incorporate the thermoplastic composition in one or more layers of the tubular member. For example, at least the inner layer 212 can include the thermoplastic composition that exhibits high resistance to hydrocarbon absorption and which is substantially inert to the materials to be carried within the tubular member 210.

The outer layer 214 and the intermediate layer 216 can include a thermoplastic composition that is the same or different than the thermoplastic composition described herein. Alternatively, other layers of the multilayer tubular member may be formed of different materials all together. For example, in one embodiment the intermediate layer 216 can exhibit high resistance to pressure and mechanical effects. By way of example, layer 216 can be formed of polyamides from the group of homopolyamides, co-polyamides, their blends or mixtures which each other or with other polymers. Alternatively, layer 216 can be formed of a fiber reinforced material such as a fiber-reinforced resin composite or the like. For example, a polyaramid (e.g., Kevlar®) woven mat can be utilized to form an intermediate layer 216 that is highly resistant to mechanical assaults. An intermediate layer can be included such as a spiraled, knitted or braided layer of textile or wire. In a spiral construction, for example, the spiraled layer may comprise two layers, each applied at or near the so-called lock angle or neutral angle of about 54° with respect to the longitudinal axis of the tubular member 210 but with opposite spiral directions. However, the tubular member 210 is not limited to spiral constructions. An intermediate layer 216 may be a knit, braided, wrapped, woven, or non-woven fabric.

Outer layer 214 can provide protection from external assaults as well as provide insulative or other desirable characteristics to the tubular member. For example, a multi-layer hose can include an outer layer 214 formed from an adequate kind of rubber material having high levels of chipping, weather, flame and cold resistance. Examples of such materials include thermoplastic elastomer such as polyamide thermoplastic elastomer, polyester thermoplastic elastomer, polyolefin thermoplastic elastomer, and styrene thermoplastic elastomer. Suitable materials for outer layer 214 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 214 can alternatively be formed of a harder, less flexible material, such as a polyolefin, polyvinylchloride, or a high density polyethylene, a fiber reinforced composite material such as a glass fiber composite or a carbon fiber composite, or a metal material such as a steel jacket.

Of course, a multi-layer tubular member is not limited to three layers, and may include two, four, or more distinct layers. A multi-layer tubular member may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

Multilayer tubular members may be made by conventional processes, such as, for example, co-extrusion, dry lamination, sandwich lamination, coextrusion coating, blow molding, continuous blow molding, and the like. By way of example, in forming a three-layered tubular member 210 as illustrated in FIG. 3, the thermoplastic composition, a polyamide composition, and a thermoplastic elastomer composition can be separately fed into three different extruders. The separate extrusion melts from those three extruders can then be introduced into one die under pressure. While producing three different tubular melt flows, those melt flows can be combined in the die in such a manner that the melt flow of the thermoplastic composition forms the inner layer 212, that of the polyamide composition forms the intermediate layer 216, and that of the thermoplastic elastomer composition forms the outer layer 214, and the thus-combined melt flows are co-extruded out of the die to produce a three-layered tubular member.

Of course, any known tube-forming methods including blow molding methods as described above is employable. For instance, in one embodiment, one or more layers of the multi-layered tubular member can be formed from a continuous tape, e.g., a fiber reinforced tape or ribbon formed according to a pultrusion formation method. A tape can be wrapped to form the tubular member or a layer of a multilayered tubular member according to known practices as are generally known in the art.

Tubular members as may be formed from the thermoplastic composition can include flow lines for oil and gas, for instance as may be utilized in off-shore and on-shore oil and gas fields and transport. Flowlines that incorporate the thermoplastic composition may be single-layered or multi-layered. When considering a multi-layer flowline, the thermoplastic composition can be utilized to form an inner barrier layer of the flowline, but it should be understood that thermoplastic composition layers of a multi-layer flowline are in no way limited to barrier layers and one or more other layers of a multi-layer flowline may incorporate the thermoplastic composition.

The flowlines can be utilized according to known practice in any gas and oil facility as is generally known in the art. By way of example, FIG. 4 illustrates a typical off shore facility including flexible risers 610 for conducting production fluid from a subsea facility to a floating vessel 620. The floating vessel 620 is illustrated floating on a body of water having a floor 640. Flexible risers 610 are provided to convey production fluid from a subsea pipeline end manifold 680 through a catenary moored buoy 650 through a yoke 660 to the floating vessel 620. The catenary moored buoy 650 is anchored by anchor lines 630 to anchors 672 provided at the floor 640. The pipeline end manifold 680 is connected by a plurality of flowlines 667 to wells 690.

Flexible risers as illustrated in FIG. 4 can have any suitable configuration. By way of example, they can be designed bonded or unbounded risers and can have a steep S or lazy S configuration or alternatively a steep wave or lazy wave configuration as are known in the art. Standard buoyancy modules 670 as illustrated in FIG. 4 may be utilized in conjunction with the flexible risers to develop the desired configuration as is known. The riser 610 passes over the buoyancy module 670 that can include, e.g., a cradle and a buoy. The buoyancy module 670 can also be attached to the anchor line 630 so as to support the riser 610 and be held in the desired position as determined by the length of the anchor line 630 and the riser 610.

Figure 5:
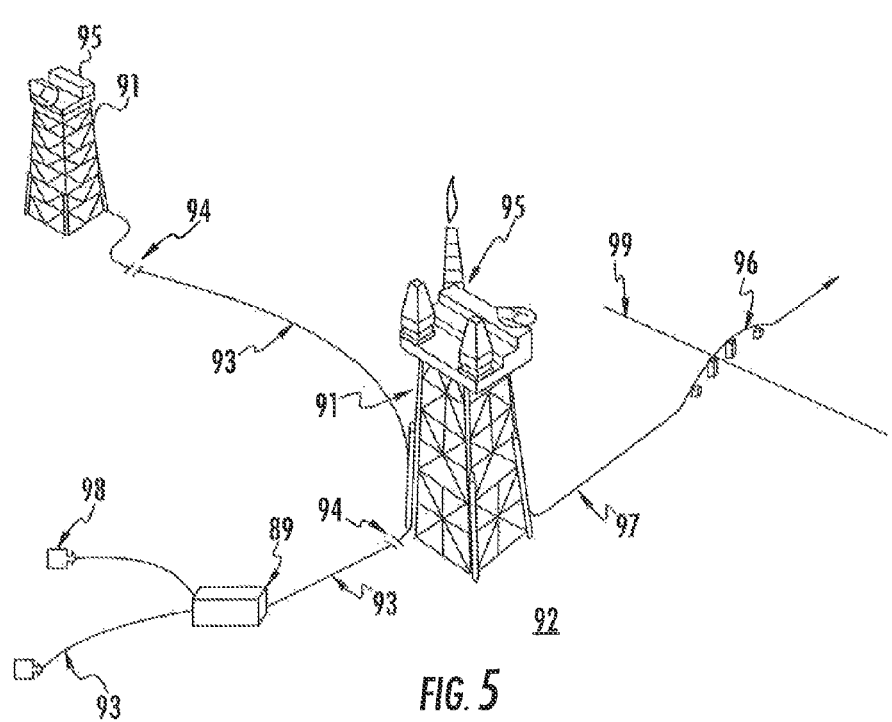
FIG. 5 illustrates an oil and gas production field incorporating multiple different types of flowlines, one or more of which can include a thermoplastic composition as described herein.

FIG. 5 illustrates a typical field that can incorporate a plurality of different types of flowlines, one or more of which may include at least a barrier layer formed of the thermoplastic composition. As can be seen, the field can include fixed risers 91 that can carry production fluid from the sea floor 92 to a platform 95. The field can include infield flowlines 93 that can carry production fluid, supporting fluids, umbilicals, etc., within the field. In addition, both the risers 91 and the infield flowlines 93 can be bundled lines as discussed above. The system also includes a plurality of tie-ins 94 at which point different flowlines can be merged, for instance to form a bundled riser and/or where individual flowlines may be altered, for instance through expansion. The system also includes a plurality of satellite wells 98 from which the hydrocarbon production fluid is obtained and manifolds. An export pipeline 97 can carry production fluid from the platform 95 to shore, a storage facility, or a transport vessel. The export pipeline 97 may also include one or more crossings 96 to by-pass other flowlines, e.g., another pipeline 99.

Referring to FIG. 6, one embodiment of a flexible riser 800 that can incorporate the thermoplastic composition is illustrated. As shown, the riser 800 has several concentric layers. An innermost layer is generally termed the carcass 802 and can be formed of helically wound stainless steel strip so as to provide resistance against external pressures. The carcass 802 is generally a metal (e.g., stainless steel) tube that supports the adjacent barrier layer 806 and prevents riser collapse due to pressure or loads applied during operation. The bore of the flexible riser 800 can vary depending upon the fluid to be carried by the riser. For instance, the riser 800 can have a smooth bore when intended for use to carry a supporting fluid such as an injection fluid (e.g., water and/or methanol) and can have a rough bore when utilized to carry production fluids (e.g., oil and gas). The carcass, when present, can generally be between about 5 and about 10 millimeters in thickness. According to one embodiment, the carcass can be formed by helically wound stainless steel strips that interlock with one another to form the strong, interconnected carcass.

The barrier layer 806 is immediately adjacent the carcass 802. As stated, the carcass layer my not be present, in which case the barrier layer 806 may be the innermost layer of the riser. The barrier layer is formed of the thermoplastic composition and provides strength and flexibility while preventing absorption and permeation through the riser wall of the hydrocarbon carried by the riser. In addition, the barrier layer 806 formed of the thermoplastic composition can resist degradation by both the fluid carried by the riser (e.g., the production fluid) as well as by temperature conditions under which the riser is utilized. The barrier layer 806 can generally be between about 3 and about 10 millimeters in thickness and can be extruded from a melt over the carcass 802 or can be formed of a pultruded tape that is wound over the carcass 802.

The riser 800 will also include an outer layer 822 that provides an external sleeve and an external fluid barrier as well as providing protection to the riser from external damage due to, e.g., abrasion or encounters with environmental materials. The outer layer 822 can be formed of a polymeric material such as the thermoplastic composition or a high density polyethylene that can resist both mechanical damage and intrusion of seawater to the inner layers of the riser. According to one embodiment, the outer layer 822 can be a composite material that includes a polymeric material in conjunction with a reinforcement material such as carbon fibers, carbon steel fibers, or glass fibers.

A hoop strength layer 804 can be located external to the barrier layer to increase the ability of the riser to withstand hoop stresses caused by forces applied to the riser wall by a pressure differential. The hoop strength layer can generally be a metal layer formed of, e.g., a helically wound strip of carbon steel that can form a layer of from about 3 to about 7 millimeters in thickness. The hoop strength layer can resist both internal pressure and bending of the riser. In one embodiment, the carbon steel strip that forms the hoop strength layer 804 can define an interlocking profile, for instance an S- or Z-cross-sectional configuration, such that adjacent windings interlock with one another to form a stronger layer. In one embodiment, the hoop strength layer can include multiple materials for added strength. For example, in an embodiment in which design and pressure requirements call for higher burst strengths, a second flat metal strip can be helically wound over the interlocked metal strips of the hoop strength layer to provide additional strength for this layer. An intervening polymeric layer such as an anti-wear layer can optionally be located between the two layers of the hoop strength layer as well.

Additional strength layers 818 and 820 can be formed of helically-wound metal (generally carbon steel) strips. The strength layers 818 and 820 can be separated from the hoop strength layer 804 and from each other by polymeric anti-wear layers 817 and 819. The strength layers 818 and 820 can provide additional hoop strength as well as axial strength to the riser. Though the riser 800 includes two strength layers 818, 820, it should be understood that a riser may include any suitable number of strength layers, including no strength layers, one, two, three, or more strength layers. In general, the helically wound metal strips of strength layers 818 and 820 will overlap but need not interlock. As such, the strength layers 818, 820 may have a width of from about 1 millimeter to about 5 millimeters.

The intervening anti-wear layers 817, 819 can be formed of the thermoplastic composition or alternatively can be formed of other polymers such as a polyamide, a high density polyethylene, or the like. In one embodiment, the anti-wear layers 817, 819 can be a composite material that includes unidirectional fibers, for instance carbon or glass fibers. For instance, the anti-wear layers 817, 819 can be formed of a polymer tape or fiber-reinforced polymer tape such as a pultruded polymer tape or ribbon that is helically wound over each strength layer. The anti-wear layers 817, 819 can prevent wear of the adjacent strength layers that can come about due to motion of the strips forming the layers.

The anti-wear layers 817, 819 can also prevent birdcaging of the adjacent layers. As with the strength layers 818, 820 of the riser 800, the number of anti-wear layers is not particularly limited, and a riser can include no anti-wear layers, one anti-wear layers, or multiple anti-wear layers depending upon the depth and local environment in which the riser will be utilized, the fluid to be carried by the riser, and so forth. The anti-wear layers 817, 819, can be relatively thin, for instance between about 0.2 and about 1.5 millimeters.

A riser may include additional layers as are generally known in the art. For example, a riser may include an insulation layer, for instance immediately internal to the outer layer 822. An insulation layer, when present can be formed of a foam, fibrous mat, or any other insulation material as is known. By way of example, single or multiple layers of an insulation tape can be wound onto the outer strength layer 820 to form an insulation layer between the outer strength layer 820 and the outer layer 822.

While the above description is for an unbounded flexible riser, it should be understood that the thermoplastic composition may likewise be utilized in forming a bonded flowline. For example, the thermoplastic composition may be utilized in forming a barrier layer and optionally one or more additional layers of a bonded flowline for use in an offshore oil and gas facility. When considering a bonded flowline, the barrier layer(s) formed of the thermoplastic material may be bonded and consolidated to the adjacent layers. Bonding of the layers may involve heating the layers following formation to a bonding temperature. Heating may be performed in a die, heater, or otherwise. A suitable heating source may be, for example, infrared, hot gas, laser, or otherwise. A bonding temperature is a temperature that allows the barrier layers and adjacent layers to be bonded together. For example, the consolidation temperature for the thermoplastic composition may be the melting point temperature, or a temperature between approximately 20° C., 15° C., 10° C., or 5° C. below the melting point temperature and the melting point temperature. Formation of a bonded flowline may further include consolidating the layers together. Consolidation may involve, for example, pressing the layers together, or simply allowing the layers to remain in contact after heating thereof. Bonding may further include cooling the resulting pipe section after consolidation.

Other flowlines for use in an oil and gas facility, for instance jumpers, pipelines, fluid supply lines, etc., can have the same general construction as a riser 800 as illustrated in FIG. 6, or may vary somewhat as to particular layers include in the multilayer flowline. For example, an injection fluid supply line, which supplies injection fluid such as methanol, glycol, and/or water to a well head, need not meet the same performance specifications as a production riser. Accordingly, at least a portion of this flowline need not include all of the various strength-enhancing layers as the riser described above. For instance, flowlines as described herein can include the barrier layer formed of the thermoplastic composition as the innermost layer, in those embodiments in which the flowline specifications do not call for an inner carcass layer as the riser described above.

The diameters of flowlines can also vary widely as is known in the art. For instance, a production fluid riser can generally have a relatively large inner diameter, from about 5 centimeters (about 2 inches) up to about 60 centimeters (about 24 inches) or even greater in some embodiments, while flowlines that carry supporting fluids to or from the well head, the manifold, the storage facility, etc., can be larger or smaller than the production fluid flowlines. For instance, an injection fluid flowline can be smaller than a production fluid flowline, for example, between about 5 centimeters (2 inches) to about 15 centimeters (6 inches) in inner diameter.

A flowline design can vary over the length of the flowline. For instance, as the offshore flowlines reach greater depths, extend to greater offshore distances, and operate at higher pressures, the flowlines that supply supporting fluids to the wells, manifolds, etc. that directly or indirectly support the hydrocarbon product extraction can increase in complexity. Accordingly, the supporting fluids may be supplied to the equipment using flowlines that vary along their length from a flowline that is designed for, e.g., lower pressure operation to a flowline that includes additional reinforcement layers for use in a more extreme environment. As the working pressure of the system increases, the supply pressures and injection pressures also increase. This increase in supply pressure may require that the flowline assemblies also be reinforced and re-engineered around the higher pressures at those locations of the system. Thus, the flowlines may vary in design across the entire length of the line. In any case, at least a portion of the flowlines can Include a barrier layer formed of the thermoplastic composition.

Flowlines can also be bundled. By way of example, FIG. 7 illustrates a bundled riser 129. The outer casing 128 can be, e.g., a steel casing or a composite casing including multiple polymeric and/or metal layers. The bundled riser 129 includes two production fluid risers 130 that can carry hydrocarbon production fluid from the sea floor to a surface facility. The production fluid risers 130 can be multilayer risers as described above and including a barrier layer formed of the thermoplastic composition. The bundled riser 129 also includes a hydraulic supply flowline 132 that supplies hydraulic fluid to the operating devices located upon the sea floor and an injection fluid flowline 133. The bundled riser 129 includes an annulus line 131, which communicates with the interspaces 127 within the bundled riser 129 and may be used to establish circulation through the production flowlines and the interspaces (or annulus). For instance, a lower end of the annulus line 131 may be connected to a port such as a side port for communication with the interspaces 127. One or more valves can be mounted between the lower end of the annulus line 131 and the interspaces 127 for controlling fluid flow between the annulus line 131 and the interspaces. The bundled riser 129 can also include a control cable 134 that can be used to control the operation of devices located upon any wellhead according to standard practice as is known to the art.

A bundled riser can include two production fluid risers 130 as illustrated in FIG. 7 or can alternatively carry a single production fluid riser or more than two production fluid risers. For instance, FIG. 8 illustrates a bundled riser 1 that includes an external casing 4 and eight production fluid risers 2. The eight production fluid risers 2 are arranged around a centrally extending conduit or tube 3 and are surrounded by external casing 4. In this arrangement, the production fluid risers 2 border on each other and form a ring and also bear against the inner side of the external casing 4 and against the outer side of the inner conduit 3, which can improve stability of the bundled riser 1 without affecting flexibility. The inner tube 3 can carry additional flowlines, such as a hydraulic flowline, injection fluid flowline, etc. as desired. In another embodiment, the inner tube 3 can function as a buoyancy line to supply additional buoyancy to the riser 1. In yet another embodiment, additional flowlines may be located in the interspaces 8 between the production fluid risers 2 and external to the inner tube 3.

Figure 9A:
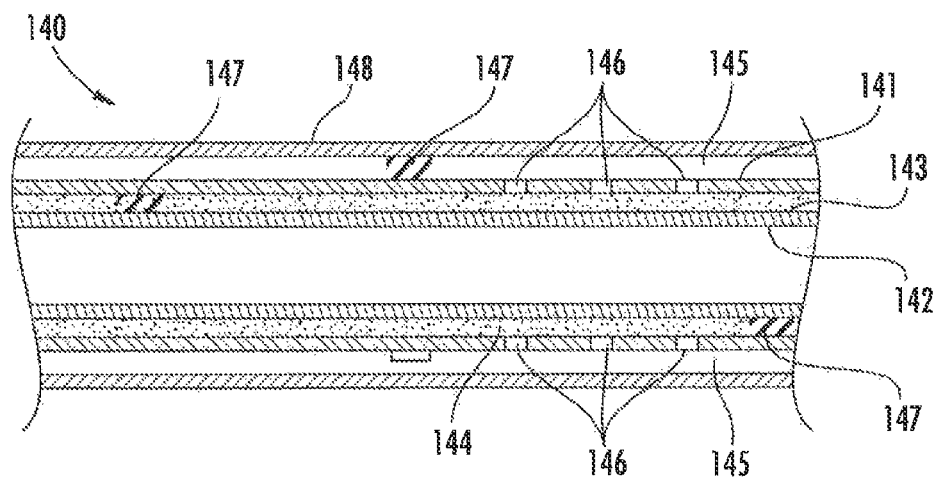
FIG. 9A is a side view and FIG. 9B is a cross-sectional view of a pipe-in-pipe flowline as may include one or more layers formed of the thermoplastic composition.
Figure 9B:
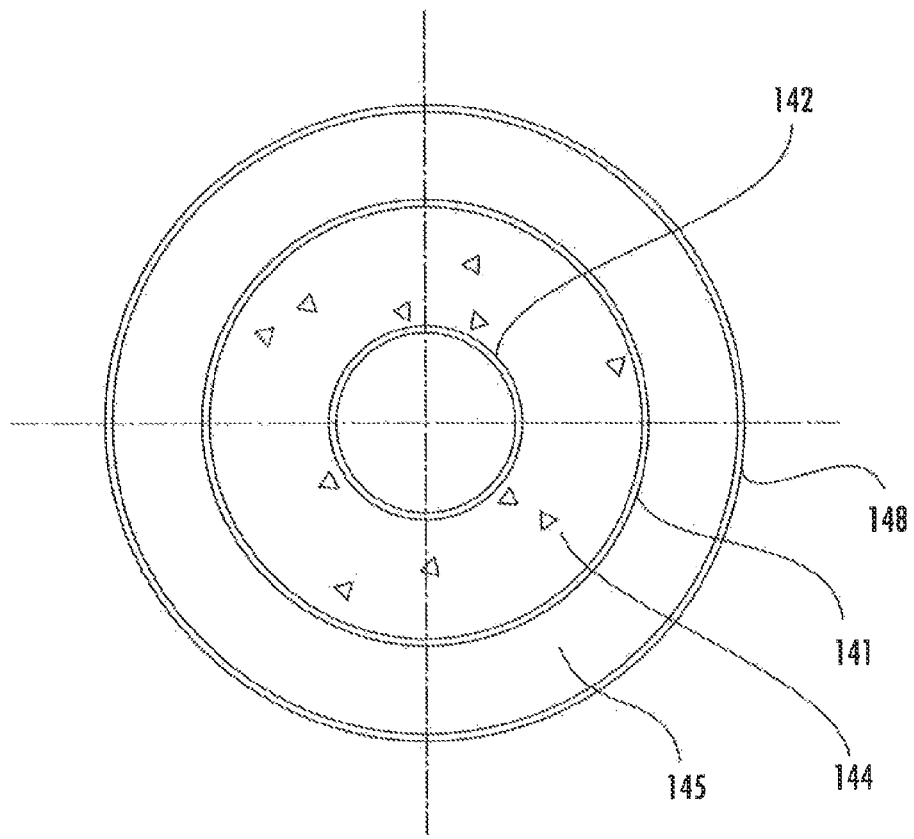

FIG. 9A and FIG. 9B illustrate a pipe-in-pipe arrangement 140 in a side view (FIG. 9A) and a cross sectional view (FIG. 9B) in which one or all of the walls 148, 141, and 142 of the lines can include a barrier layer formed of the thermoplastic composition. In this particular embodiment, the pipe-in-pipe flowline is an insulated flowline that includes an inner production fluid flowline 142 encased in an external casing 148. The inner production fluid flowline 142 is also encased in a jacket 141. In this particular embodiment, the annulus 143 between the inner production fluid flowline 142 and the jacket 141 is filled with an insulation material 144, such as open celled foam as is known in the art. The space 145 external to the jacket 141 and inside the external casing 140 can carry a supporting fluid, such as water, methanol, etc. or can be filled with a high pressure gas, which can further improve the insulative properties of the pipe-in-pipe flowline, for instance by providing access points 146 from the space 145 that carries the high pressure gas to the insulation material 144. The pipe-in-pipe arrangement can also include spacers 147 to maintain the desired distances between the production fluid flowline 142, the jacket 142, and the external casing 148. Other combination flowlines such as piggy-back flowlines are also encompassed herein.

Figure 10:
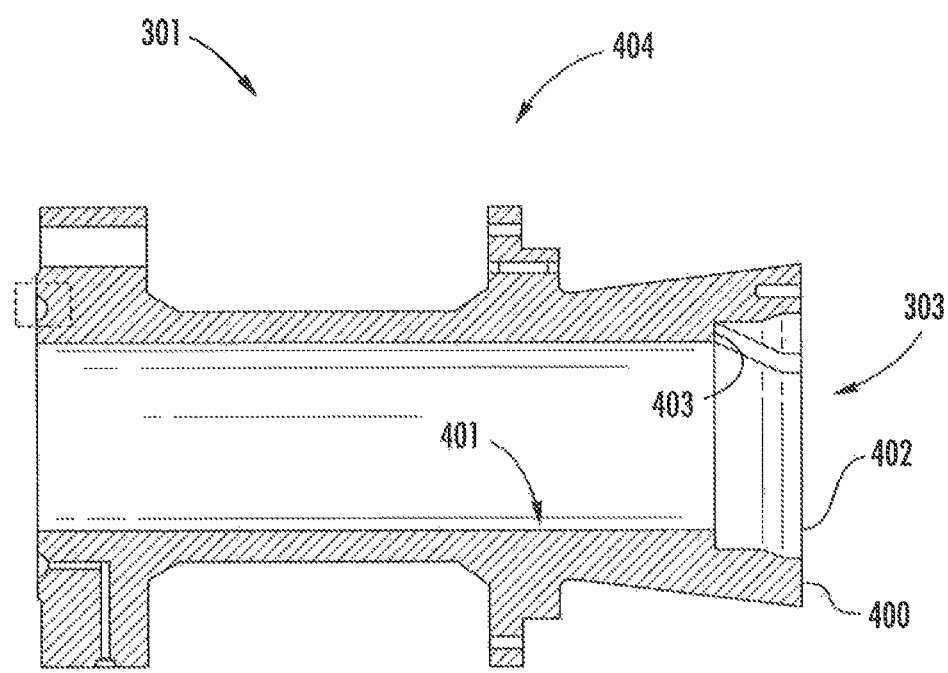
FIG. 10 illustrates a pipe connector that may include the thermoplastic composition as described herein.

Other components of the flowline system such as fittings, connectors, anchors, and so forth can also include the polyarylene sulfide composition. For example, an end fitting that receives the end of a flowline such as discussed above such that the flowline is both anchored and sealed with the end fitting can be formed of the polyarylene sulfide composition. By way of example, FIG. 10 illustrates an end fitting 301 for a flowline that can be formed of the polyarylene sulfide composition. The open mouth region 303 is formed by the open rim 400 of the end fitting. This rim defines a circular open mouth through which a flowline may be introduced. The inner surface 401 includes a first stepped region 402 provided to receive a barrier layer sealing ring when a flowline is located in the end fitting and a further stepped region 403 arranged to receive a further sealing ring for sealing ends of layers of the flowline. The remainder of the inner surface 401 can define a substantially smooth inner bore along which transportation fluid will flow during use. The end fitting 301 also can include a fastening region 404 extending outwardly from the waist of the body to which further parts of the fitting may be secured during process of terminating the a flowline in the end fitting.

The thermoplastic composition may be utilized in forming all manner of components as may be incorporated in a fluid handling system in addition to those discussed above such as, without limitation, flanges, valves, valve seats, seals, sensor housings, thermostats, thermostat housings, diverters, linings, propellers, and so forth. In one embodiment, the thermoplastic composition may be utilized in automotive applications, for instance in hoses, belts, etc. that may be subject to extreme temperatures as well as large temperature fluctuations during use.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions. Tensile bars for the hydrocarbon volume uptake test are injection molded to ASTM D630 specifications according to standard ASTM conditions.

Melt Viscosity: All materials are dried for 1.5 hours at 150° C. under vacuum prior to testing. The melt viscosity is measured on a capillary rheometer at 310° C. and 1200 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1 (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Hydrocarbon Volume Uptake: Absorption and diffusion testing was performed using ASTM D638 Type 4 tensile bars. Each material was immersed in Brent crude oil, hydrocarbon/water mixture (and in a one-off test to hydrocarbon only). Rates and amounts of liquid absorbed were measured. The hydrocarbon liquid mixture had the following composition:

| Volume percent (%) | Composition |
|---|---|
| 10 | Distilled water |
| 60 | 70% heptane, 20% cyclohexane and 10% toluene |
| balance | Nitrogen |

Exposure testing was conducted at 60° C. and 130° C. utilizing a heated glass reactor or a sealed stainless steel reactor, air having been removed from the test vessel by purging with nitrogen; the test being conducted at vapor pressure.

EXAMPLE 1

Materials utilized to form the compositions included the following:

Polyarylene sulfide: Fortron® 0214 linear polyphenylene sulfide available from Ticona Engineering Polymers of Florence, Ky.

First Impact Modifier: LOTADER® AX8840—a random copolymer of ethylene and glycidyl methacrylate available from Arkema, Inc.

Second Impact Modifier: GUR® GHR 8020 available from Ticona Engineering Polymers of Florence, Ky.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, first impact modifier, second impact modifier and lubricant were fed to the main feed throat in the first barrel by means of a gravimetric feeder. Upon melting and mixing of the ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in the table below. Amounts are provided as weight percentages based upon the weight of the sample.

| Component | Sample 1 | Sample 2 | Sample 3 | Sample 4 |
|---|---|---|---|---|
| First Impact Modifier | 20 | 10 | 2 | 10 |
| Second Impact Modifier | 0 | 10 | 18 | 10 |
| Crosslinking Agent | 1.5 | 0 | 0 | 0.75 |
| Lubricant | 0.3 | 0.3 | 0.3 | 0.3 |
| Polyarylene Sulfide | 78.2 | 79.7 | 79.7 | 78.95 |

Following formation, samples were tested for a variety of physical characteristics. Results are provided in the table below.

| | Sample 1 | Sample 2 | Sample 3 | Sample 4 |
|---|---|---|---|---|
| Melt Viscosity (poise) | 3785 | 2569 | 2167 | 2631 |
| Flexural Modulus (MPa) | 1923 | 2076 | 2384 | 1966 |
| Tensile Modulus (MPa) | 1799 | 2025 | 2318 | 1978 |
| Tensile Break Stress (MPa) | 47.05 | 42.33 | 45.03 | 44.59 |
| Tensile Break Strain (%) | 96.24 | 27.43 | 38.86 | 97.04 |
| Tensile Yield Strain (%) | 38.52 | 5.59 | 6.85 | 9.37 |
| Charpy Notched Impact Strength (room temp.) | 49 ± 3.2 | 13.5 ± 0.9 | 7.9 ± 0.8 | 50.7 ± 1.4 |
| Charpy Notched Impact Strength (−30° C.) | 18.5 ± 0.7 | 7.4 ± 0.5 | 6.4 ± 0.8 | 12.4 ± 1.1 |
| Deflection Temperature Under Load (° C.) | 99.3 | 98.9 | 101.2 | 99.6 |

The samples were also tested for resistance to hydrocarbon absorption. Hydrocarbon uptake testing was carried out at 60° C. in a sealed glass reactor. Results are provided in the table, below.

|  | Sample 1 | Sample 2 | Sample 3 | Sample 4 |
|---|---|---|---|---|
| CD % | 7.5 | 0.0 | 0.0 | 7.5 |
| Weight Change | | | | |
| 96 hours | 4.45 | −0.3 | 0.26 | 0.19 |
| 168 hours | 7.65 | 0.81 | −0.37 | −0.34 |
| 336 hours | 3.95 | 0.06 | 0.12 | 0.23 |
| Density | | | | |
| 96 hours | 99.28 | 99.76 | 99.96 | 99.74 |
| 168 hours | 96.98 | 99.36 | 99.80 | 99.89 |
| 336 hours | 98.85 | 99.95 | 99.98 | 99.80 |
| Volume | | | | |
| 96 hours | 5.49 | 0.70 | 1.26 | 1.19 |
| 168 hours | 8.92 | 1.82 | 0.63 | 0.66 |
| 336 hours | 5.01 | 1.06 | 1.12 | 1.23 |

As can be seen, the addition of the second impact modifier to the composition provides great improvement in the hydrocarbon resistance of the materials (Samples 2,3) as compared to the control (Sample 1). In addition, dynamic crosslinking of the composition (Sample 4) provides a product with impact properties and tensile properties similar to that of the control (Sample 1) but can do so with much lower addition levels of the first impact modifier.

EXAMPLE 2

Materials utilized to form the compositions included the following:

Polyarylene sulfide: Fortron® 0214 linear polyphenylene sulfide available from Ticona Engineering Polymers of Florence, Ky.

First Impact Modifier: LOTADER® AX8840—a random copolymer of ethylene and glycidyl methacrylate available from Arkema, Inc.

Second Impact Modifier: Pebax 2533 SA 01 available from Arkema

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifiers and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in the table below. Amounts are provided as weight percentages based upon the weight of the sample.

| Component | Sample 5 | Sample 6 | Sample 7 |
|---|---|---|---|
| First Impact Modifier | 15 | 10 | 15 |
| Second Impact Modifier | 0 | 5 | 5 |
| Crosslinking Agent | 1.5 | 1 | 1.5 |
| Lubricant | 0.3 | 0.3 | 0.3 |
| Polyarylene Sulfide | 83.20 | 83.7 | 78.20 |

Following formation, samples were tested for a variety of physical characteristics. Results are provided in the table below.

|  | Sample 5 | Sample 6 | Sample 7 |
|---|---|---|---|
| Melt Viscosity (poise) | 2967 | 1920 | 2257 |
| Tensile Modulus (MPa) | 2214 | 2247 | 2000 |
| Tensile Break Stress (MPa) | 50.96 | 49.32 | 43.89 |
| Tensile Break Strain (%) | 46.81 | 51.58 | 23.75 |
| Charpy Notched Impact Strength (room temp.) | 27.0 | 7.5 | 5.9 |
| Charpy Notched Impact Strength (−30° C.) | 10.7 | 3.3 | 2.9 |

The samples were also tested for resistance to hydrocarbon absorption after immerged in 144 hr. exposure to hydrocarbon. Hydrocarbon uptake testing was carried out at 130° C. in a sealed stainless steel reactor. Results are provided in the table, below. Amounts are provided as percentages based upon the weight of the sample.

|  | Sample 5 | Sample 6 | Sample 7 |
|---|---|---|---|
| Weight Change | 7.23 | 5.78 | 5.48 |
| Density Retention | 96.41 | 96.48 | 95.18 |
| Volume Change | 11.22 | 9.62 | 10.44 |

As can be seen, partially replacing the first impact modifier with the second impact modifier provides improvement in the hydrocarbon resistance while still maintaining the tensile properties (Sample 5 vs. Sample 6). Moreover, the addition of the second impact modifier to the composition provided improvement in both material flexibility and the hydrocarbon resistance (Sample 5 vs. Sample 7).

EXAMPLE 3

Materials utilized to form the compositions Included the following:

Polyarylene sulfide: Fortron® 0214 linear polyphenylene sulfide available from Ticona Engineering Polymers of Florence, Ky.

First Impact Modifier: LOTADER® AX8840—a random copolymer of ethylene and glycidyl methacrylate available from Arkema, Inc.

Second Impact Modifier: GENIOPLAST® Pellet S available from Wacker

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifiers and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in the table below. Amounts are provided as weight percentages based upon the weight of the sample.

| Component | Sample 8 | Sample 9 | Sample 10 |
|---|---|---|---|
| First Impact Modifier | 15 | 10 | 15 |
| Second Impact Modifier | 0 | 6 | 6 |
| Crosslinking Agent | 1.5 | 1 | 1.5 |
| Lubricant | 0.3 | 0.3 | 0.3 |
| Polyarylene Sulfide | 83.2 | 83.8 | 78.30 |

Following formation, samples were tested for a variety of physical characteristics. Results are provided in the table below.

| | Sample 8 | Sample 9 | Sample 10 |
|---|---|---|---|
| Melt Viscosity (poise) | 2967 | 2390 | 2874 |
| Tensile Modulus (MPa) | 2214 | 2297 | 2038 |
| Tensile Break Stress (MPa) | 50.96 | 50.98 | 47.69 |
| Tensile Break Strain (%) | 46.81 | 45.85 | 58.86 |
| Charpy Notched Impact Strength (room temp.) | 27.0 | 15.4 | 21.0 |
| Charpy Notched Impact Strength (−30° C.) | 10.7 | 8.1 | 14.3 |

The samples were also tested for resistance to hydrocarbon absorption after 144 hr. exposure to hydrocarbon. Hydrocarbon uptake testing was carried out at 130° C. in a sealed stainless steel reactor. Results are provided in the table, below.

| | Sample 8 | Sample 9 | Sample 10 |
|---|---|---|---|
| Weight Change | 7.23 | 6.64 | 6.90 |
| Density Retention | 96.41 | 97.09 | 96.64 |
| Volume Change | 11.22 | 9.81 | 10.12 |

As can be seen, partially replacing the first impact modifier with the second impact modifier provides improvement in the hydrocarbon resistance while still maintains its tensile properties (Sample 8 vs. Sample 10). The addition of the second impact modifier to the composition provided improvement in both material flexibility and the hydrocarbon resistance while still the impact strength (Sample 8 vs. Sample 10).

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A thermoplastic composition including
a polyarylene sulfide,
a first impact modifier in an amount of less than 20% by weight based on the weight of the thermoplastic composition, and
a second impact modifier,
wherein the first impact modifier is a crosslinked impact modifier.

2. The thermoplastic composition of claim 1, wherein both the first impact modifier and the second impact modifier are crosslinked.

3. The thermoplastic composition of claim 1, wherein the polyarylene sulfide is crosslinked.

4. The thermoplastic composition of claim 1, wherein the thermoplastic composition exhibits a weight change of about 6% or less following contact with a heated hydrocarbon solution for four days.

5. The thermoplastic composition of claim 1, wherein the thermoplastic composition exhibits a density retention of about 95% or greater following contact with a heated hydrocarbon solution for six days.

6. The thermoplastic composition of claim 1, wherein the thermoplastic composition exhibits a volume change about 10.5% or less following contact with a heated hydrocarbon solution for six days.

7. The thermoplastic composition of claim 1, wherein the first impact modifier is an olefinic copolymer or terpolymer.

8. The thermoplastic composition of claim 7, wherein the crosslinked first impact modifier comprises the reaction product of an epoxy functionality of the first impact modifier and a crosslinking agent or comprises the reaction product of a maleic anhydride functionality of the first impact modifier and a crosslinking agent.

9. The thermoplastic composition of claim 1, wherein the polyarylene sulfide is a polyphenylene sulfide.

10. The thermoplastic composition of claim 9, wherein the second impact modifier is a homopolymer or a copolymer of ethylene.

11. The thermoplastic composition of claim 10, wherein the second impact modifier is a high molecular weight homopolymer or copolymer of ethylene or an ultrahigh molecular weight homopolymer or copolymer of ethylene.

12. The thermoplastic composition of claim 1, wherein the second impact modifier is a homopolymer or a copolymer of ethylene.

13. The thermoplastic composition of claim 12, wherein the second impact modifier is a high molecular weight homopolymer or copolymer of ethylene or an ultrahigh molecular weight homopolymer or copolymer of ethylene.

14. The thermoplastic composition of claim 1, wherein the second impact modifier is a siloxane polymer.

15. The thermoplastic composition of claim 14, wherein the second impact modifier is combined with fumed silica.

16. The thermoplastic composition of claim 15, wherein the second impact modifier is a polydimethyl siloxane.

17. The thermoplastic composition of claim 1, wherein the second impact modifier is a thermoplastic elastomer.

18. The thermoplastic composition of claim 17, wherein the thermoplastic elastomer is a block copolymer.

19. The thermoplastic composition of claim 18, wherein the thermoplastic elastomer is a polyamide and polyether block copolymer.

20. The thermoplastic composition of claim 1, wherein the second impact modifier in the form of particles.

21. The thermoplastic composition of claim 20, wherein the particles have a mean particle diameter $D_{50}$ ranging from about 5 micrometers to about 1000 micrometers.

22. The thermoplastic composition of claim 1, further comprising one or more additives.

23. The thermoplastic composition of claim 22, the one or more additives comprising fillers, a UV stabilizer, a heat stabilizer, a lubricant, a flame retardant, a nucleating agent, or a colorant.

24. A shaped product comprising the thermoplastic composition according to claim 1.

25. The shaped product according to claim 24, wherein the shaped product is an extruded product, an injection molded product, a blow-molded product, a pultruded product, a thermoformed product, or a compression molded product.

26. The shaped product according to claim 24, wherein the shaped product is a single layer or multilayered tubular member.

27. The shaped product according to claim 26, wherein the shaped product is a multilayered tubular member comprising an inner layer, the inner layer including the thermoplastic composition.

28. The shaped product according to claim 24, wherein the shaped product is a flowline for an oil and/or gas production application.

29. The shaped product according to claim 28, wherein the flowline is a bonded or unbonded riser, a bundled flowline, a support fluid flowline, or a pipe-in-pipe.

30. The shaped product according to claim 29, the riser comprising a barrier layer formed of the thermoplastic composition.

31. A method for forming a thermoplastic composition comprising:
feeding a polyarylene sulfide to a melt processing unit;
feeding a first impact modifier to the melt processing unit, the polyarylene sulfide and the impact modifier mixing in the melt processing unit such that the impact modifier becomes distributed throughout the polyarylene sulfide, wherein the first impact modifier is present in an amount of less than 20% by weight based on the weight of the thermoplastic composition;
feeding a second impact modifier to the melt processing unit, the polyarylene sulfide and the second impact modifier mixing in the melt processing unit such that the second impact modifier becomes distributed throughout the polyarylene sulfide; and
crosslinking at least one of the first and second impact modifiers.

32. The method of claim 31, further comprising feeding a crosslinking agent to the melt processing unit, the crosslinking agent being fed to the melt processing unit following distribution of the first and second impact modifiers throughout the polyarylene sulfide, the crosslinking agent comprising reactive functionality that is reactive to reactive functionality of at least one of the first impact modifier and the second impact modifier.

33. The method of claim 31, further comprising feeding a disulfide compound to the melt processing unit.

34. The method of claim 33, the disulfide compound comprising reactive functionality at one or more terminal ends of the disulfide compound.

35. The method of claim 31, further comprising shaping the thermoplastic composition according to a method comprising one or more of extrusion, injection molding, blow-molding, thermoforming, foaming, compression molding, hot-stamping, fiber spinning, and pultrusion.

36. The method of claim 35, wherein the step of shaping the thermoplastic composition comprises extruding the thermoplastic composition over a carcass of a flowline.

* * * * *